(12) United States Patent
Jin

(10) Patent No.: US 12,348,994 B2
(45) Date of Patent: Jul. 1, 2025

(54) METHOD AND APPARATUS FOR CONFIGURING MEASUREMENT OF CHANNEL PATHLOSS FOR PLURALITY OF TRPs IN WIRELESS COMMUNICATION SYSTEM

(71) Applicant: Samsung Electronics Co., Ltd., Suwon-si (KR)

(72) Inventor: Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/864,887

(22) Filed: Jul. 14, 2022

(65) Prior Publication Data

US 2023/0029273 A1 Jan. 26, 2023

(30) Foreign Application Priority Data

Jul. 15, 2021 (KR) ........................ 10-2021-0093075

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC .... H04B 17/309; H04B 7/024; H04B 17/347; H04L 5/00; H04L 5/0048; H04W 16/32; H04W 52/14; H04W 52/24; H04W 24/08
See application file for complete search history.

(56) References Cited

U.S. PATENT DOCUMENTS

2021/0143922 A1* 5/2021 Jin ..................... H04W 24/08
2022/0022141 A1* 1/2022 Cirik .................. H04L 25/0226
2022/0046552 A1* 2/2022 Xu ........................ H04L 1/189

(Continued)

FOREIGN PATENT DOCUMENTS

WO 2021/030674 A1 2/2021
WO 2021/038656 A1 3/2021

OTHER PUBLICATIONS

ZTE, 'Multi-TRP enhancements for PDCCH, PUCCH and PUSCH', R1-2102661, 3GPP TSG RAN WG1 Meeting #104b-e, e-Meeting, Apr. 7, 2021.

(Continued)

*Primary Examiner* — Benjamin H Elliott, IV
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes receiving, from a base station, a radio resource control (RRC) message including information on a pathloss reference signal (RS) list, information on a first mapping between at least one first pathloss RS of the pathloss RS list and at least one first sounding reference signal (SRS) resource indicator (SRI) of a first SRS resource set, and information on a second mapping between at least one second pathloss RS of the pathloss RS list and at least one second SRI of a second SRS resource set, (Continued)

receiving, from the base station, downlink control information (DCI) including an SRI field, identifying a pathloss for a physical uplink shared channel (PUSCH) and transmitting the PUSCH based on the identified pathloss.

18 Claims, 21 Drawing Sheets

(56) References Cited

U.S. PATENT DOCUMENTS

| | | | | |
|---|---|---|---|---|
| 2022/0116882 | A1* | 4/2022 | Guo | H04W 52/146 |
| 2022/0167279 | A1* | 5/2022 | Zhou | H04W 52/146 |
| 2022/0295418 | A1* | 9/2022 | Okamura | H04W 52/242 |
| 2022/0360382 | A1* | 11/2022 | Sun | H04B 7/024 |
| 2022/0385415 | A1* | 12/2022 | Matsumura | H04L 5/005 |
| 2022/0417773 | A1* | 12/2022 | Zheng | H04L 5/0094 |
| 2023/0029273 | A1* | 1/2023 | Jin | H04W 24/08 |
| 2023/0171763 | A1* | 6/2023 | Gao | H04W 52/58 |
| | | | | 370/329 |
| 2023/0189254 | A1* | 6/2023 | Go | H04W 72/1268 |
| | | | | 370/329 |
| 2023/0254877 | A1* | 8/2023 | Matsumura | H04W 72/231 |
| | | | | 370/329 |
| 2024/0155517 | A1* | 5/2024 | Wang | H04W 52/58 |
| 2024/0178965 | A1* | 5/2024 | Gao | H04L 5/0048 |
| 2024/0298271 | A1* | 9/2024 | Gao | H04W 52/365 |
| 2024/0314704 | A1* | 9/2024 | Li | H04W 52/146 |
| 2024/0314773 | A1* | 9/2024 | Matsumura | H04L 5/0048 |

OTHER PUBLICATIONS

Qualcomm Incorporated, 'Enhancements on Multi-TRP for PDCCH, PUCCH and PUSCH', R1-2104655, 3GPP TSG RAN WG1 Meeting #105-bis-e, e-Meeting, May 12, 2021.

TCL Communication, 'Enhancements on Multi-TRP for PUCCH and PUSCH', R1-2105837, 3GPP TSG RAN WG1 Meeting #105-e, e-Meeting, May 12, 2021.

International Search Report and Written Opinion dated Oct. 19, 2022, issued in International Patent Application No. PCT/KR2022/010291.

3rd Generation Partnership Project; Technical Specification Group Radio Access Network; NR; Physical layer procedures for control (Release 16), 3GPP TS 38.213 V16.6.0, Jun. 2021.

* cited by examiner

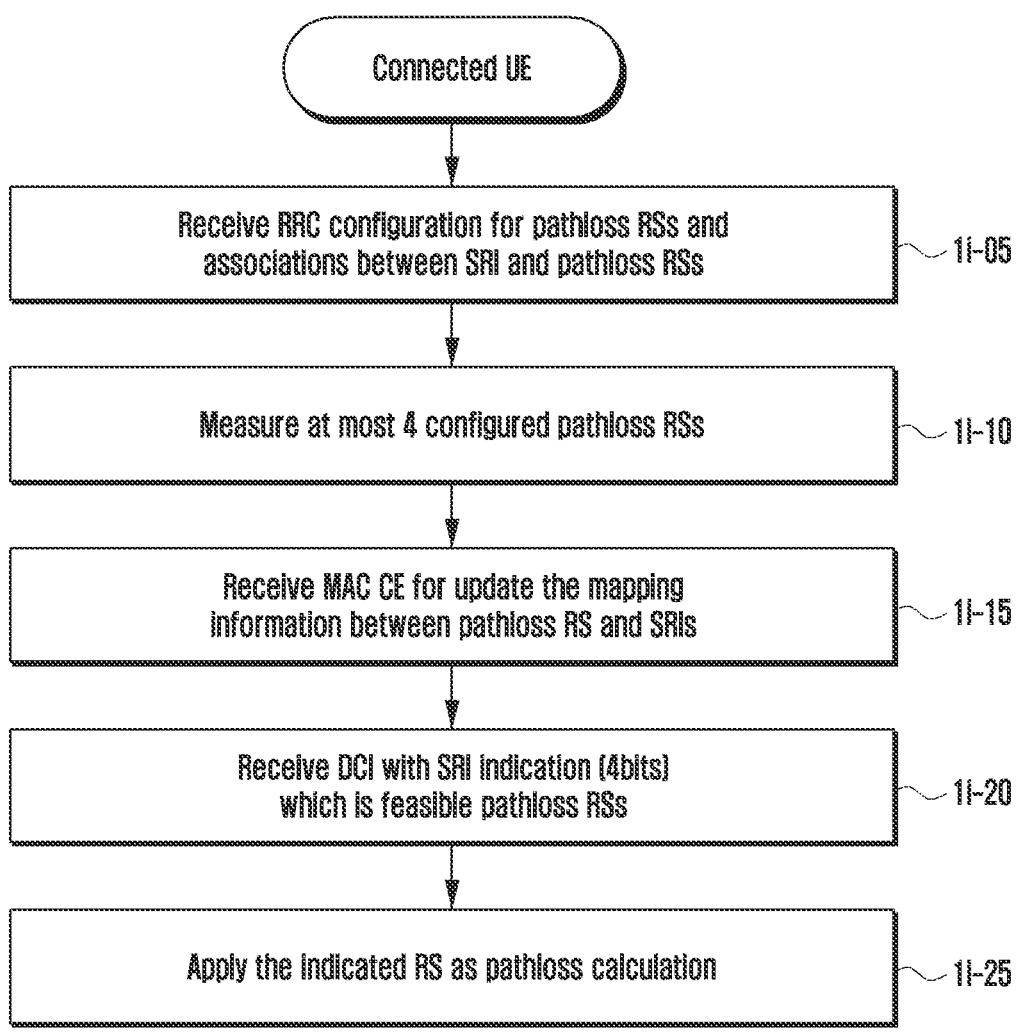

FIG. 1L
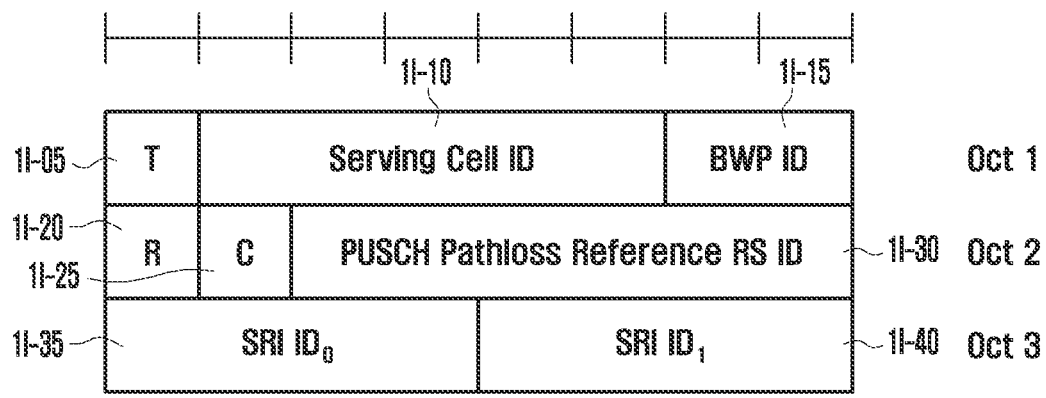
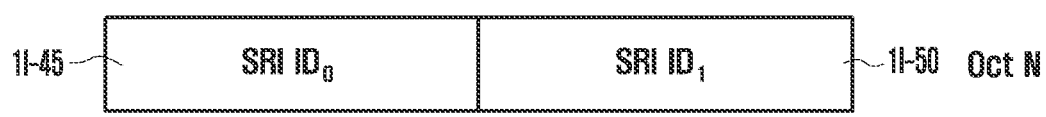
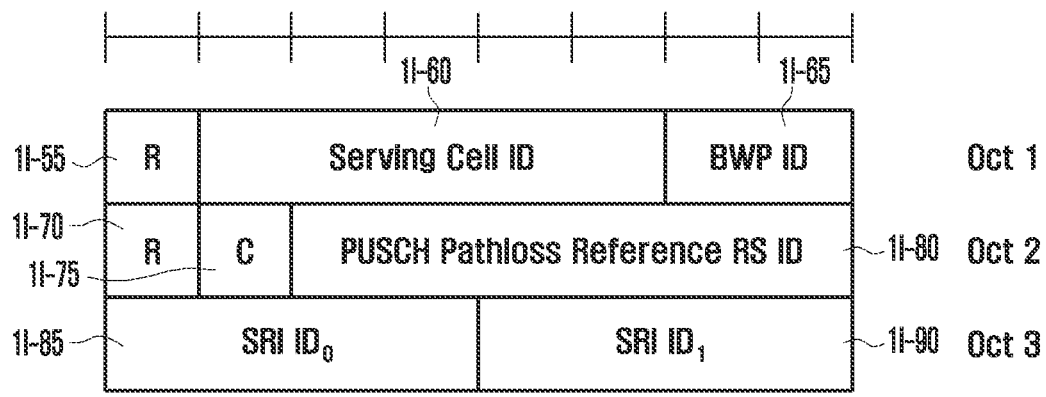
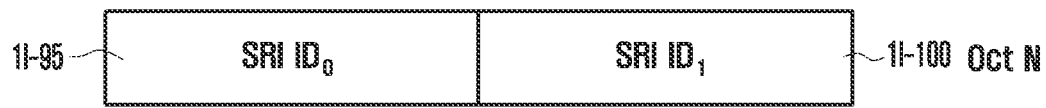

FIG. 1P
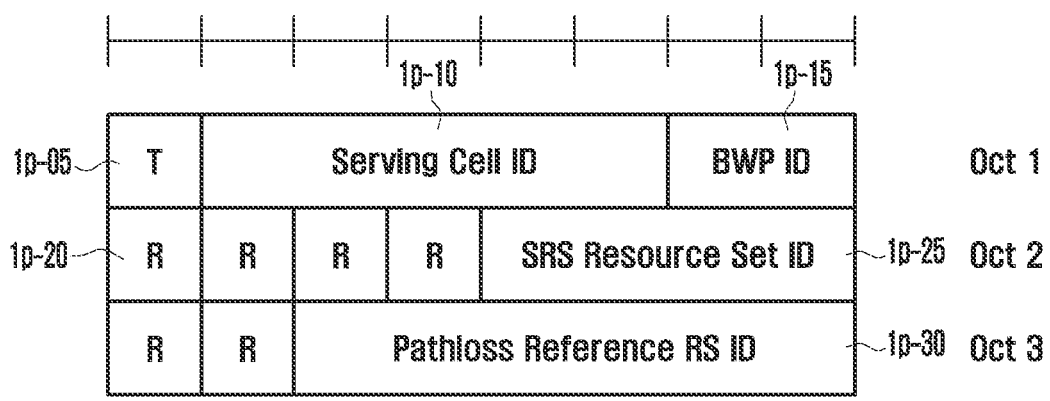
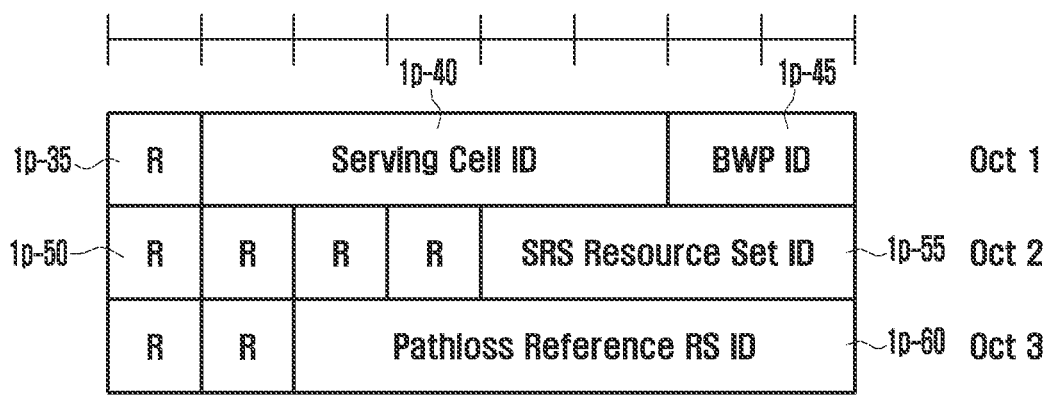

METHOD AND APPARATUS FOR CONFIGURING MEASUREMENT OF CHANNEL PATHLOSS FOR PLURALITY OF TRPs IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0093075, filed on Jul. 15, 2021, in the Korean Intellectual Property Office, the disclosure of which is incorporated by reference herein in its entirety.

BACKGROUND

1. Field

The disclosure relates to a method and an apparatus for measuring pathloss of a communication channel and applying the same by a terminal in a next-generation mobile communication system using beams.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, according to the development of new radio (NR) communication technology, a multi-transmission reception point (TRP) operation in which a cell in which a base station operating on the basis of a beam services includes a plurality of transmission reception points (TRPs) has been introduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method by which a terminal measures a pathloss of a communication channel and applies the same in a next-generation mobile communication system using beams and to improve the method of measuring and applying the conventional pathloss by using a multiple input multiple output (MIMO) capability. Particularly, according to the introduction of a plurality of transmission reception points (TRPs) within a cell, it is required to measure a channel received for each TRP in which case an operation of configuring measurement of the pathloss for each TRP and dynamically updating the measurement is needed.

According to an embodiment, the UE can efficiently measure and apply pathloss of communication channels for a plurality of TRPs in which case a plurality of pathloss resources configured by the BS can be dynamically measured and applied.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, a radio resource control (RRC) message including information on a pathloss reference signal (RS) list, information on a first mapping between at least one first pathloss RS of the pathloss RS list and at least one first sounding reference signal (SRS) resource indicator (SRI) of a first SRS resource set, and information on a second mapping between at least one second pathloss RS of the pathloss RS list and at least one second SRI of a second SRS resource set, receiving, from the base station, downlink control information (DCI) including an SRI field, identifying a pathloss for a physical uplink shared channel (PUSCH) based on the SRI field in the DCI and the first mapping or the second mapping, and transmitting, to the base station, the PUSCH based on the identified pathloss.

In accordance with another aspect of the disclosure, a method performed by a base station in a wireless communication system is provided. The method includes transmitting, to a terminal, an RRC message including information on a pathloss RS list, information on a first mapping between at least one first pathloss RS of the pathloss RS list and at least one first SRI of a first SRS resource set, and information on a second mapping between at least one second pathloss RS of the pathloss RS list and at least one second SRI of a second SRS resource set, transmitting, to the terminal, DCI including an SRI field, and receiving, from the terminal, a PUSCH according to the DCI. The SRI field in the DCI and the first mapping or the second mapping are used to identify a pathloss for the PUSCH.

In accordance with another aspect of the disclosure, a terminal in a wireless communication system is provided. The terminal includes a transceiver and a controller. The controller is configured to receive, from a base station via the transceiver, an RRC message including information on a pathloss RS list, information on a first mapping between at least one first pathloss RS of the pathloss RS list and at least one first SRI of a first SRS resource set, and information on a second mapping between at least one second pathloss RS of the pathloss RS list and at least one second SRI of a second SRS resource set, receive, from the base station via the transceiver, DCI including an SRI field, identify a pathloss for a PUSCH based on the SRI field in the DCI and the first mapping or the second mapping, and transmit, to the base station via the transceiver, the PUSCH based on the identified pathloss.

In accordance with another aspect of the disclosure, a base station in a wireless communication system is provided. The base station includes a transceiver and a controller. The controller is configured to transmit, to a terminal via the transceiver, an RRC message including information on a pathloss RS list, information on a first mapping between at least one first pathloss RS of the pathloss RS list and at least one first SRI of a first SRS resource set, and information on a second mapping between at least one second pathloss RS of the pathloss RS list and at least one second SRI of a second SRS resource set, transmit, to the terminal via the transceiver, DCI including an SRI field, and receive, from the terminal via the transceiver, a PUSCH according to the DCI. The SRI field in the DCI and the first mapping or the second mapping are used to identify a pathloss for the PUSCH.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I is a flowchart illustrating an operation of the user equipment (UE) for calculating a pathloss by applying an indicated pathloss reference signal (pathloss reference RS) among pathloss RSs configured in the PUSCH in the NR system according to an embodiment of the disclosure;

FIG. 1L illustrates a MAC CE structure and a mapping method for dynamically updating mapping between pathloss RSs for a plurality of TRPs and sounding reference signal (SRS) resource indicators (SRIs) according to an embodiment of the disclosure;

FIG. 1O is a flowchart illustrating an operation of the UE for calculating a pathloss by applying an indicated pathloss RS among pathloss RSs configured in SRS transmission in the NR system according to an embodiment of the disclosure;

FIG. 1P illustrates a MAC CE structure and a mapping method for dynamically updating pathloss RSs required to be measured according to an embodiment of the disclosure;

The same reference numerals are used to represent the same elements throughout the drawings.

DETAILED DESCRIPTION

Figure 1A:
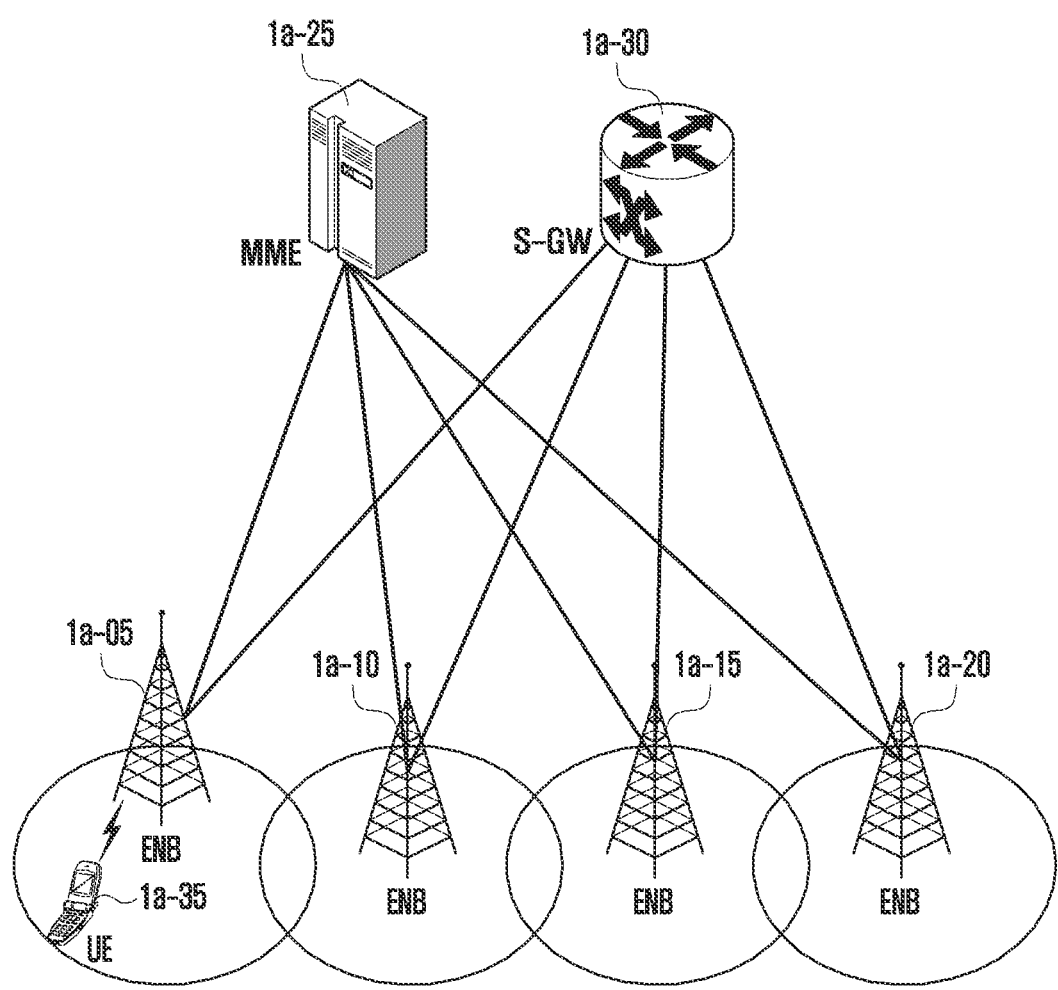
FIG. 1A illustrates a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments set forth herein, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project (3GPP) long term evolution (LTE) standards for the convenience of description. However, the disclosure is not limited by these terms and names, and may be applied in the same way to systems that conform other standards.

FIG. 1A illustrates a structure of an LTE system according to an embodiment of the disclosure.

Referring to FIG. 1A, a radio access network of the LTE system includes next-generation base stations (or evolved node Bs) (hereinafter, referred to as gNBs, eNBs, Node Bs, or base stations) 1a-05, 1a-10, 1a-15, and 1a-20, a mobility management entity (MME) 1a-25, and a serving gateway (S-GW) 1a-30 as illustrated. A user terminal (hereinafter, referred to as a user equipment (UE) or a terminal) 1a-35 accesses an external network through the eNBs 1a-05 to 1a-20 and the S-GW 1a-30.

In FIG. 1A, the eNBs 1a-05 to 1a-20 correspond to the existing node Bs of the universal mobile telecommunications service (UMTS) system. The eNB is connected to the UE 1a-35 through a radio channel, and performs a more complicated role than that of the conventional node B. In the LTE system, since all user traffic including a real-time service such as voice over IP (VoIP) via an Internet protocol are served through a shared channel, an apparatus for collecting and scheduling status information on buffer statuses of UEs, available transmission power status, and channel statuses is required, and the eNBs 1a-05 to 1a-20 may serve as this apparatus. One eNB generally controls plural cells. For example, in order to implement a transmission rate of 100 Mbps, the LTE system may use orthogonal frequency division multiplexing (OFDM) as a wireless access technology in a bandwidth of 20 MHz. Further, an adaptive modulation and coding (AMC) scheme of determining a modulation scheme and a channel-coding rate is applied depending on the channel status of the UE. The S-GW 1a-30 is a device for providing a data bearer, and generates or removes the data bearer under the control of the MME 1a-25. The MME is a device for performing not only a function of managing the mobility of the UE but also various control functions, and may be connected to a plurality of eNBs.

Figure 1B:
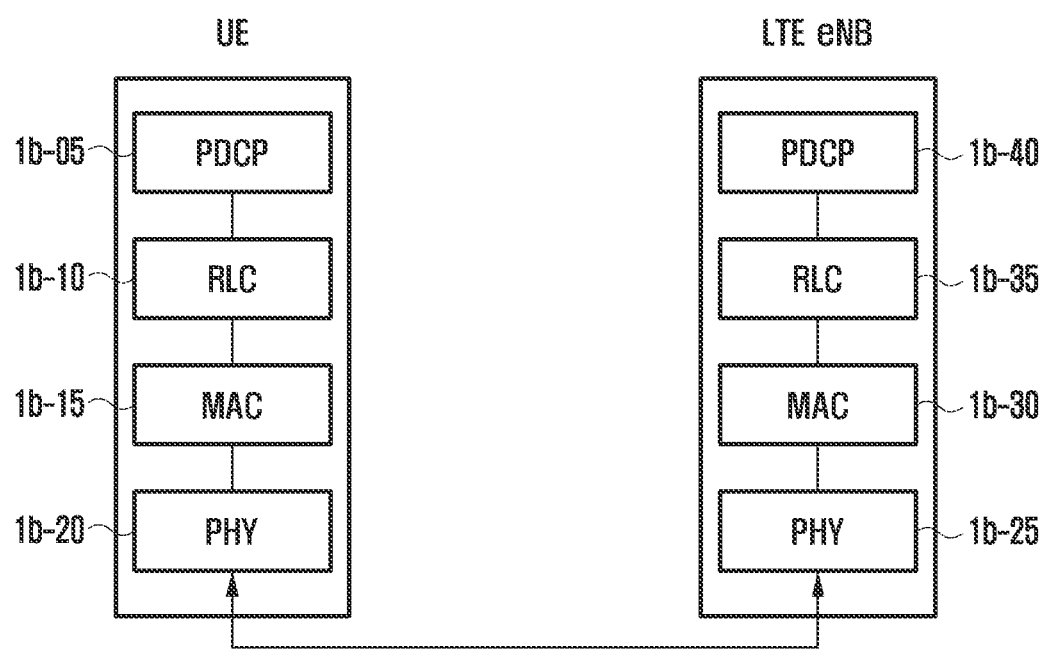
FIG. 1B illustrates a radio protocol structure in the LTE system according to an embodiment of the disclosure.

FIG. 1B illustrates a wireless protocol structure in the LTE system according to an embodiment of the disclosure.

Referring to FIG. 1B, the UE and the eNB include packet data convergence protocols (PDCPs) 1b-05 and 1b-40, radio link controls (RLCs) 1b-10 and 1b-35, and medium access controls (MACs) 1b-15 and 1b-30, respectively, in the wireless protocol of the LTE system. The PDCPs 1b-05 and 1b-40 perform an operation of compressing/decompressing an IP header. The main functions of the PDCP are described below.

Header compression and decompression function (robust header compression (ROHC) only)
User data transmission function (transfer of user data)
Sequential delivery function (in-sequence delivery of upper-layer protocol data units (PDUs) at PDCP reestablishment procedure for RLC acknowledged mode (AM))
Reordering function (for split bearers in dual connectivity (DC) (only support for RLC AM): PDCP PDU routing for transmission and PDCP PDU reordering for reception)
Duplicate detection function (duplicate detection of lower layer service data units (SDUs) at PDCP re-establishment procedure for RLC AM)
Retransmission function (retransmission of PDCP SDUs at handover and, for split bearers in DC, of PDCP PDUs at PDCP data-recovery procedure, for RLC AM)
Ciphering and deciphering function (ciphering and deciphering)
Timer-based SDU removal function (timer-based SDU discard in uplink)

Radio link controls (RLCs) 1b-10 and 1b-35 reconfigure a PDCP PDU to be the appropriate size and perform an automatic repeat request (ARQ) operation. The main functions of the RLC are summarized below.

Data transmission function (transfer of upper layer PDUs)
ARQ function (error Correction through ARQ (only for AM data transfer))
Concatenation, segmentation, and reassembly function (concatenation, segmentation and reassembly of RLC SDUs (only for unacknowledged mode (UM) and acknowledged mode (AM) data transfer))
Re-segmentation function (re-segmentation of RLC data PDUs (only for AM data transfer))
Reordering function (reordering of RLC data PDUs (only for UM and AM data transfer))
Duplication detection function (duplicate detection (only for UM and AM data transfer))
Error detection function (protocol error detection (only for AM data transfer))

RLC SDU deletion function (RLC SDU discard (only for UM and AM data transfer))

RLC reestablishment function (RLC reestablishment)

The MACs 1b-15 and 1b-30 are connected with various RLC layer devices included in one UE, and perform an operation for multiplexing RLC PDUs to the MAC PDU and demultiplexing the RLC PDUs from the MAC PDU. The main functions of the MAC are summarized below.

Mapping function (mapping between logical channels and transport channels)

Multiplexing and demultiplexing function (multiplexing/demultiplexing of MAC SDUs belonging to one or different logical channels into/from Transport Blocks (TB) delivered to/from the physical layer on transport channels)

Scheduling information report function (scheduling information reporting)

Hybrid ARQ (HARQ) function (error correction through HARQ)

Logical channel priority control function (priority handling between logical channels of one UE)

UE priority control function (priority handling between UEs by means of dynamic scheduling)

Multimedia broadcast multicast service (MBMS) service identification function (MBMS service identification)

Transport format selection function (transport format selection)

Padding function (padding)

The physical (PHY) layers 1b-20 and 1b-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer. Further, the PHY layer uses hybrid ARQ (HARQ) to correct an additional error, and a receiving side transmits 1 bit indicating whether a packet transmitted by a transmitting side is received. The 1 bit is referred to as HARQ acknowledgment/non-acknowledgment (ACK/NACK) information. Downlink HARQ ACK/NACK information on uplink transmission may be transmitted through a physical hybrid-ARQ indicator channel (PHICH), and uplink HARQ ACK/NACK information on downlink transmission may be transmitted through a physical uplink control channel (PUCCH) or a physical uplink shared channel (PUSCH).

Meanwhile, the PHY layer may include one or a plurality of frequencies/subcarriers, and a technology for simultaneously configuring and using a plurality of frequencies is referred to as carrier aggregation (CA). The CA significantly increases the amount of transmission by the number of subcarriers by additionally using a primary carrier and one or a plurality of subcarriers, which is beyond the conventional technology, in which only one subcarrier is used for communication between the UE and the evolved UMTS terrestrial radio access network (E-UTRAN) NodeB (eNB). Meanwhile, in LTE, a cell within the eNB using a primary carrier is referred to as a Primary Cell (PCell) and a secondary carrier is referred to as a Secondary Cell (SCell).

Although not illustrated, there is a radio resource control (RRC) layer above the PDCP layer of each of the UE and the eNB, and the RRC layer may transmit and receive an access- and measurement-related configuration control message to control radio resources.

Figure 1C:
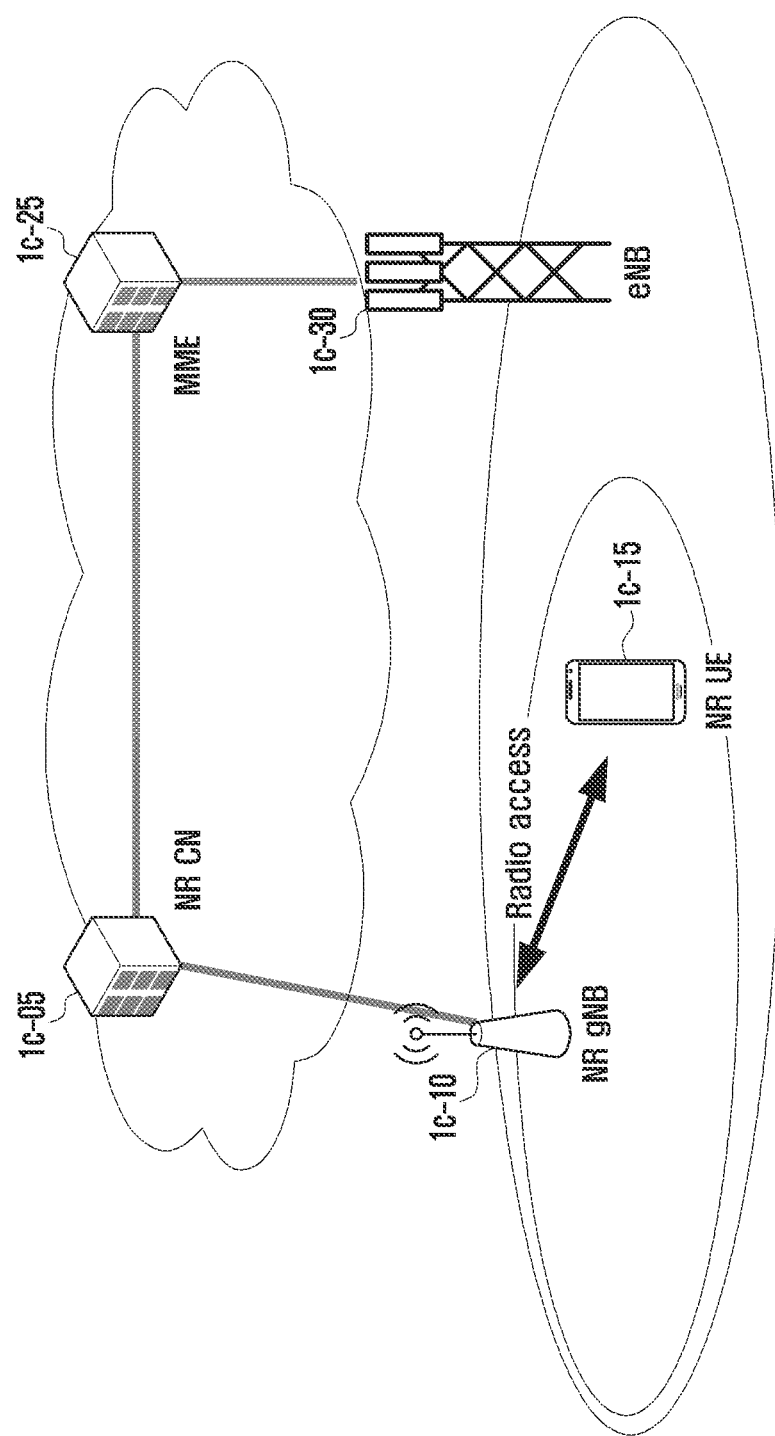
FIG. 1C illustrates a structure of a next-generation mobile communication system according to an embodiment of the disclosure.

FIG. 1C illustrates a structure of a next-generation mobile communication system according to an embodiment of the disclosure.

Referring to FIG. 1C, the radio access network of the next-generation mobile communication system includes a next-generation base station 1c-10 (hereinafter, interchangeably used with new radio node B, NR NB, next generation nodeB, gNodeB, or gNB) and a new radio core network (NR CN) 1c-05 (or next generation core network (NG CN). A user terminal 1c-15 (new radio user equipment) (hereinafter, referred to as a NR UE or a UE) accesses an external network through the NR NB 1c-10 and the NR CN 1c-05.

In FIG. 1C, the NR NB 1c-10 corresponds to an evolved Node B (eNB) of the conventional LTE system. The NR NB may be connected to an NR UE 1c-15 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, and corresponds to the NR NB 1c-10. One NR NB generally controls a plurality of cells. The NR NB may have a bandwidth wider than the conventional maximum bandwidth in order to implement super-high-speed data transmission compared to conventional LTE, may apply orthogonal frequency-division multiplexing (OFDM) through radio access technology, and may further apply beamforming technology. Further, an adaptive modulation and coding (AMC) scheme of determining a modulation scheme and a channel-coding rate is applied depending on the channel status of the UE. The NR CN 1c-05 performs a function of supporting mobility, configuring a bearer, and configuring a quality of service (QoS). The NR CN is a device which performs not only a function of managing mobility of the UE but also various control functions and is connected to a plurality of eNBs. Further, the next-generation mobile communication system may be linked to the conventional LTE system, and the NR CN is connected to an MME 1c-25 through a network interface. The MME is connected to an eNB 1c-30, which is a conventional base station.

Figure 1D:
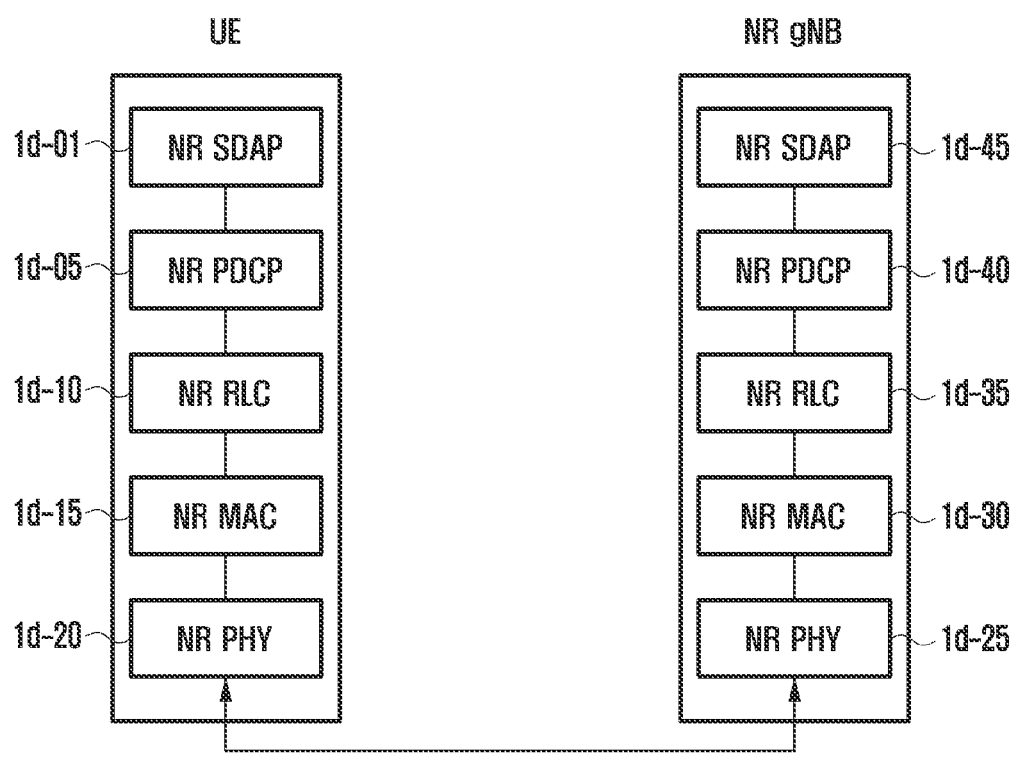
FIG. 1D illustrates a wireless protocol structure of the next-generation mobile communication system according to an embodiment of the disclosure.

FIG. 1D illustrates a wireless protocol structure of the next-generation mobile communication system according to an embodiment of the disclosure.

Referring to FIG. 1D, the wireless protocol of the next-generation mobile communication system includes NR service data adaptation protocols (SDAPs) 1d-01 and 1d-45, NR PDCPs 1d-05 and 1d-40, NR RLCs 1d-10 and 1d-35, and NR MACs 1d-15 and 1d-30 in the UE and the NR gNB.

The main functions of the NR SDAPs 1d-01 and 1d-45 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow identifier (ID) for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCP 1d-05 or 1d-40 may include some of the following functions.

- Header compression and decompression function (header compression and decompression: ROHC only)
- User data transmission function (transfer of user data)
- Sequential delivery function (in-sequence delivery of upper layer PDUs)
- Non-sequential delivery function (out-of-sequence delivery of upper-layer PDUs)
- Reordering function (PDCP PDU reordering for reception)
- Duplicate detection function (duplicate detection of lower-layer SDUs)
- Retransmission function (retransmission of PDCP SDUs)
- Ciphering and deciphering function (ciphering and deciphering)
- Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

- Data transmission function (transfer of upper-layer PDUs)
- Sequential delivery function (in-sequence delivery of upper layer PDUs)
- Non-sequential delivery function (out-of-sequence delivery of upper-layer PDUs)
- ARQ function (error correction through ARQ)
- Concatenation, segmentation, and reassembly function (concatenation, segmentation, and reassembly of RLC SDUs)
- Re-segmentation function (re-segmentation of RLC data PDUs)
- Reordering function (reordering of RLC data PDUs)
- Duplicate detection function (duplicate detection)
- Error detection function (protocol error detection)
- RLC SDU deletion function (RLC SDU discard)
- RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices configured in one UE, and the main functions of the NR MACs may include some of the following functions.

- Mapping function (mapping between logical channels and transport channels)
- Multiplexing and demultiplexing function (multiplexing/demultiplexing of MAC SDUs)
- Scheduling information report function (scheduling information reporting)
- HARQ function (error correction through HARQ)
- Logical channel priority control function (priority handling between logical channels of one UE)
- UE priority control function (priority handling between UEs by means of dynamic scheduling)
- MBMS service identification function (MBMS service identification)
- Transport format selection function (transport format selection)
- Padding function (padding)

The NR PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 1E:
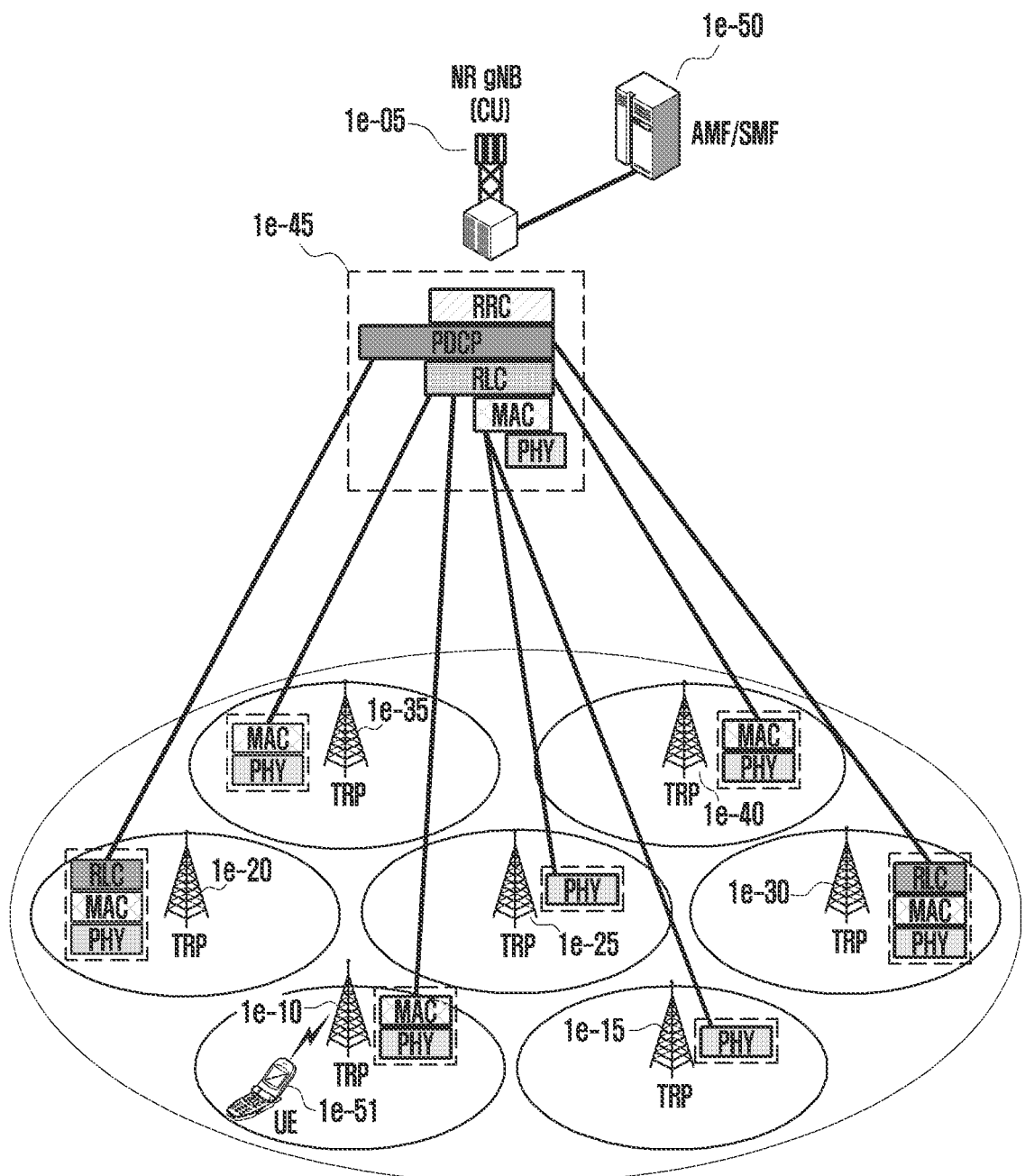
FIG. 1E illustrates a structure of the next-generation mobile communication system including a plurality of transmission reception points (TRPs) according to an embodiment of the disclosure.

FIG. 1E illustrates a structure of the next-generation mobile communication system including a plurality of TRPs according to an embodiment of the disclosure.

Referring to FIG. 1E, a cell served by an NR gNB 1e-05 operating on the basis of the beam may include a plurality of transmission reception points (TRPs) 1e-10, 1e-15, 1e-20, 1e-25, 1e-30, 1e-35, and 1e-40. The TRPs 1e-10 to 1e-40 indicate blocks separating some functions of transmitting and receiving physical signals by the conventional LTE eNB and include a plurality of antennas. The NR gNB 1e-05 may be expressed as a central unit (CU) and the TRP may be expressed as a distributed unit (DU). Functions of the NR gNB 1e-05 and the TRP may be configured by separated layers such as PDCP/RLC/MAC/PHY layers 1e-45. For example, the TRPs may have only the PHY layer and perform a function of the corresponding layer as indicated by reference numerals 1e-15 and 1e-25, the TRPs may have only the PHY layer and the MAC layer and perform functions of the corresponding layers as indicated by reference numerals 1e-10, 1e-35, and 1e-40, and the TRPs may have only the PHY layer, the MAC layer, and the RLC layer and perform functions of the corresponding layers as indicated by reference numerals 1e-20 and 1e-30. Particularly, the TRPs 1e-10 to 1e-40 may use a beamforming technology of generating narrow beams in various directions through a plurality of transmission/reception antennas and transmitting/receiving data. The UE 1e-51 may access the NR gNB 1e-05 and the external network through the TRPs 1e-10 to 1e-40. In order to provide a service to users, the NR gNB 1e-05 may collect and schedule status information such as buffer statuses, available transmission power statuses, and channel statuses of UEs and support the connection between the UEs and a core network (CN), particularly between AMF/SMF 1e-50.

Although the specification describes, as an example, the structures 1e-15 and 1e-25 in which the TRPs may have only the PHY layer and perform the function of the corresponding layer for convenience of description, the scope of the disclosure is not limited thereto.

In general, the UE may measure pathloss resources and reflect the measured pathloss to determine uplink transmission power. The disclosure proposes a method of reducing measurement complexity of the UE according to an increase in the number of pathloss resources which can be measured through improvement of a MIMO function and dynamically controlling measurement for various pathloss resources in a next-generation mobile communication system.

In general, consumption of uplink transmission power may be defined as shown in Equation 1 below.

$$\text{Transmissionpower} = \text{Targetreceivedpower} + \text{Pathloss} + (\text{dynamic adjustment}) \qquad \text{Equation 1}$$

As shown in Equation 1, the UE may determine the uplink transmission intensity through a sum of transmission power of a downlink signal received from the NR gNB, the signal intensity measured through a pathloss reference signal, and influenced dynamic adjustment within a UE RF. That is, the UE needs to measure the pathloss reference signal in order to calculate the signal intensity for uplink transmission, and configuration information for a measurement resource type and method for the measurement may be included in RRC parameters (for example, PUSCH-Config, SRS-Config, and the like) for the uplink configuration. A detailed operation is described in detail with reference to the following embodiments of the disclosure. The measurement of the pathloss reference signal is an L3 measurement value (determined by the UE in consideration of both a previous measurement value and a current measurement value) and may be understood as the concept in which a measurement window exists.

Figure 1F:
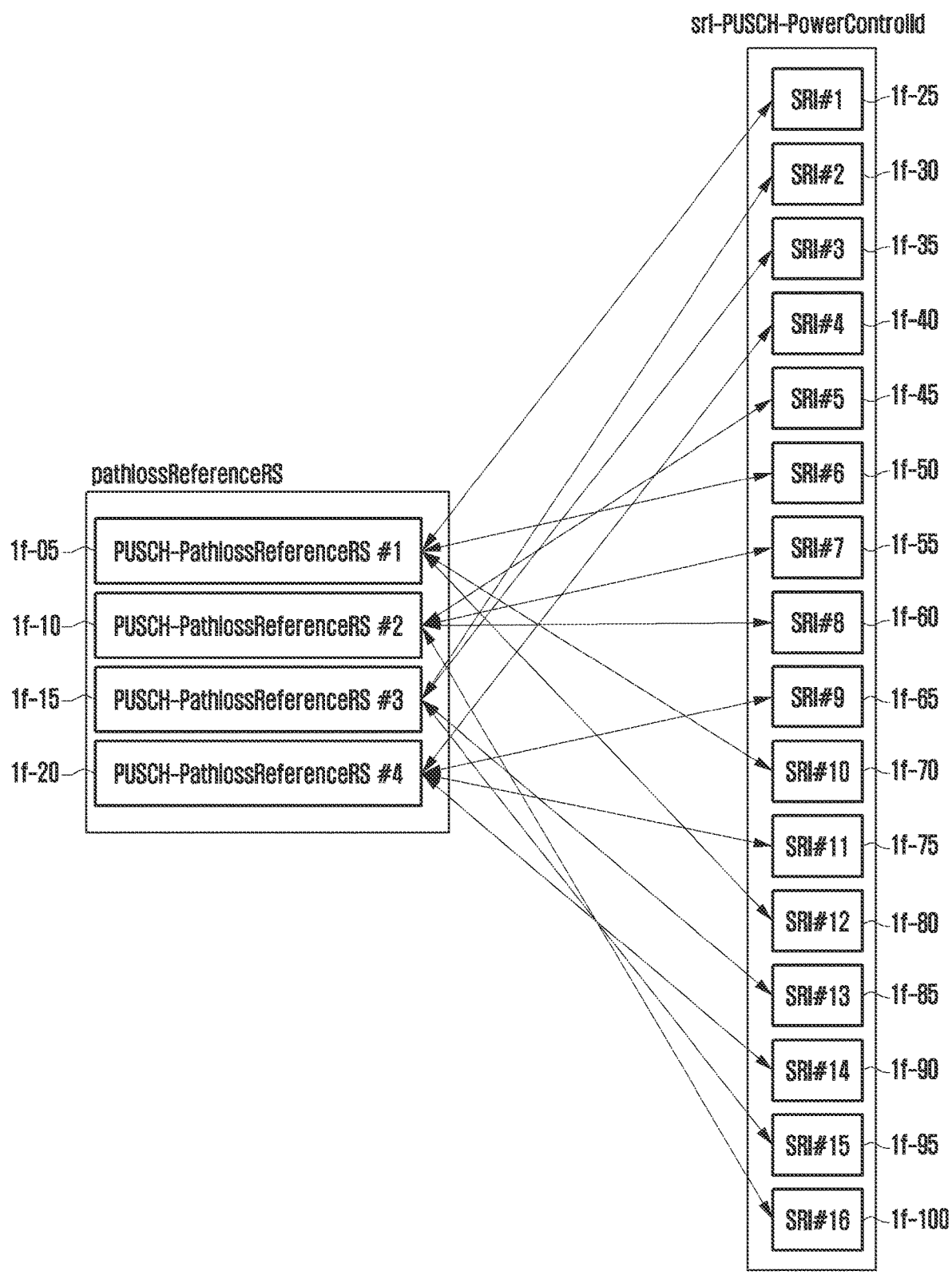
FIG. 1F illustrates a type and a configuration method of measurement resources for a pathloss reference signal (hereinafter, referred to a pathloss reference ResourceSet (RS)) configured in a physical uplink shared channel (PUSCH) in a new radio (NR) system according to an embodiment of the disclosure.

FIG. 1F illustrates a type and a configuration method of measurement resources for a pathloss reference signal (hereinafter, referred to a pathloss reference RS) configured in a PUSCH in an NR system according to an embodiment of the disclosure.

Particularly, in the drawing, the operation of the conventional NR system is described, and may be referred to for an embodiment proposed in the disclosure thereafter.

In the measurement of the pathloss reference signal (pathloss reference RS) applied to PUSCH transmission, a maximum of 64 (4 in Rel-15) pathloss reference signals (pathloss reference RSs) available in PUSCH configuration information (for example, PUSCH-Config) included in the RRC message may be configured. The UE may measure pathloss reference signals (pathloss reference RSs) configured for 4 resources among the configured resources and apply the same to PUSCH transmission. That is, in order to calculate PUSCH transmission power, the UE may reflect a pathloss reference signal (pathloss reference RS) measurement value. The operation related to the configuration and application of the pathloss reference signal (pathloss reference RS) used for PUSCH transmission is described below.

1. Provide mapping information used to indicate pathloss reference signals (pathloss reference RSs) available through the RRC configuration and the pathloss reference signal (pathloss reference RS) applied to actual PUSCH transmission.

PUSCH-PathlossReferenceRS: configures a maximum of 64 (4 in Rel-15) pathloss reference signals
   Index for the Pathloss Reference RS
   Configuration as one of CSI-RS resources or SSB resources
   The UE measures first 4 reference signals among the configured pathloss reference signals (pathloss reference RSs)
SRI-PUSCH-PowerControl: configures mapping with pathloss reference signals (pathloss reference RSs) used for actual PUSCH transmission which can be indicated through an SRS resource indicator (SRI) bit of dynamic control information (DCI) (a maximum of 16 mapping)
   Index information used for indicating an SRI of PUSCH transmission
   Index for a pathloss reference RS associated with a corresponding SRI index
   Detailed power configuration (sri-P0-PUSCH-AlphaSetId, sri-PUSCH-ClosedLoopIndex)
Further, since the UE can measure a maximum of 4 pathloss reference signals (pathloss reference RSs), the number of sri-PUSCH-PathlossReferenceRS-Id associated with all sri-PUSCH-PowerControlId is limited to a maximum of 4.
A maximum of 4 pathloss reference signals (pathloss reference RSs) which should be initially measured may use the conventionally used list, and a list for a maximum of 60 pathloss reference signal (pathloss reference RS) configurations may be actually measured only when an update is performed through a MAC control element (CE).

The RRC configuration may be indicated by ASN.1 as shown in Table 1 below.

TABLE 1

| PUSCH-PowerControl ::= | SEQUENCE { |
|---|---|
| tpc-Accumulation | ENUMERATED { disabled } |
| OPTIONAL, -- Need S | |
| msg3-Alpha | Alpha |
| OPTIONAL, -- Need S | |
| p0-NominalWithoutGrant | INTEGER (-202..24) |

TABLE 1-continued

```
OPTIONAL, -- Need M
    p0-AlphaSets              SEQUENCE (SIZE (1. .maxNrofP0-PUSCH-
AlphaSets)) OF P0-PUSCH-AlphaSet   OPTIONAL, -- Need M
    pathlossReferenceRSToAddModList   SEQUENCE (SIZE
(1..maxNrofPUSCH-PathlossReferenceRSs)) OF PUSCH-PathlossReferenceRS
    OPTIONAL, -- Need N
    pathlossReferenceRSToReleaseList   SEQUENCE (SIZE
(1. .maxNrofPUSCH-PathlossReferenceRSs)) OF PUSCH-PathlossReferenceRS-Id
    OPTIONAL, -NeedN
    twoPUSCH-PC-AdjustmentStates      ENUMERATED {twoStates}
OPTIONAL, - Need S
    deltaMCS                  ENUMERATED {enabled}
OPTIONAL, - Need S
    sri-PUSCH-MappingToAddModList     SEQUENCE (SIZE
(1..maxNrofSRI-PUSCH-Mappings)) OF SRI-PUSCH-PowerControl
    OPTIONAL, - Need N
    sri-PUSCH-MappingToReleaseList    SEQUENCE (SIZE (L.maxNrofSRI-
PUSCH-Mappings)) OF SRI-PUSCH-PowerControlId
    OPTIONAL -- Need N
    }
    PUSCH-PathlossReferenceRS-r16 :=  SEQUENCE {
    pusch-PathlossReferenceRS-Id-r16   PUSCH-PathlossReferenceRS-Id-v1610,
    referenceSignal-r16       CHOICE {
    ssb-Index-r16             SSB-Index,
    csi-RS-Index-r16              NZP-CSI-RS-ResourceId
    }
    }
    PUSCH-PathlossReferenceRS-Id ::=   INTEGER (0..maxNrofPUSCH-
PathlossReferenceRSs-1)
    PUSCH-PathlossReferenceRS-Id-v1610 ::= INTEGER (maxNrofPUSCH-
PathlossReferenceRSs..maxNrofPUSCH-PathlossReferenceRSs-1-r16)
    SRI-PUSCH-PowerControl ::=        SEQUENCE {
    sri-PUSCH-PowerControlId      SRI-PUSCH-PowerControlId,
    sri-PUSCH-PathlossReferenceRS-Id  PUSCH-PathlossReferenceRS-Id,
    sri-P0-PUSCH-AlphaSetId       P0-PUSCH-AlphaSetId,
    sri-PUSCH-ClosedLoopIndex     ENUMERATED { i0, i1 }
    }
    SRI-PUSCH-PowerControlId ::=      INTEGER (0. maxNrofSRI-PUSCH-
Mappings-1)
    PUSCH-PowerControl-vl610 :=       SEQUENCE {
    pathlossReferenceRSToAddModListSizeExt-v1610   SEQUENCE (SIZE
(l..maxNrofPUSCH-PathlossReferenceRSsDiff-rl6)) OF PUSCH-
PathlossReferenceRS-r16
    OPTIONAL, -- Need N
    pathlossReferenceRSToReleaseListSizeExt-v1610  SEQUENCE (SIZE
(1.maxNrofPUSCH-PathlossReferenceRSsDiff-rl6)) OF PUSCH-
PathlossReferenceRS-Id-v1610
    OPTIONAL, -- Need N
    p0-PUSCH-SetList-r16          SEQUENCE (SIZE (1..maxNrofSRI-
PUSCH-
Mappings)) OF P0-PUSCH-Set-r16    OPTIONAL, -- Need R
    olpc-ParameterSet             SEQUENCE {
    olpc-ParameterSetDCI-0-1-r16      INTEGER (1..2)
OPTIONAL, -- Need R
    olpc-ParameterSetDCI-0-2-r16      INTEGER (L.2)
OPTIONAL -- Need R
    }
OPTIONAL, -- Need M
    ...
    }
```

2. Through a MAC CE for updating mapping between the pathloss reference RS and the SRI, the UE dynamically indicates the pathloss reference RS which should be measured and can be indicated by the SRI. Detailed MAC CE structure and operation method are described below.

3. A specific pathloss reference RS used for PUSCH transmission (based on codebook or non-codebook) through DCI format 0_1 is indicated by an SRI indicator. This is an operation in which the UE measures a maximum of 4 pathloss reference RSs in no. 1 operation but only one pathloss reference RS which is actually applied is specified.

FIG. 1F illustrates a maximum of 4 pathloss reference RS configurations which can be configured in Rel-15 through PUSCH-Config of the RRC message as in operation no. 1, particularly, PUSCH-PathlossReferenceRS as indicated by reference numerals 1f-05 to 1f-20. Further, pathloss reference RSs associated with SRI indicators which can be configured through PUSCH-Config of the RRC message, particularly, SRI-PUSCH-PowerControl may be configured as indicated by reference numerals 1f-25 to 1f-100. As described above, mapping between the SRI indicator configured through RRC and the pathloss reference RS is configured and one pathloss reference RS used for actual PUSCH transmission may be indicated through the SRI indicator of DCI. At this time, mapping between the SRI indicator and the pathloss reference RS has no separate limitation, and a maximum number of pathloss reference RSs which can be configured may be 4.

Figure 1G:
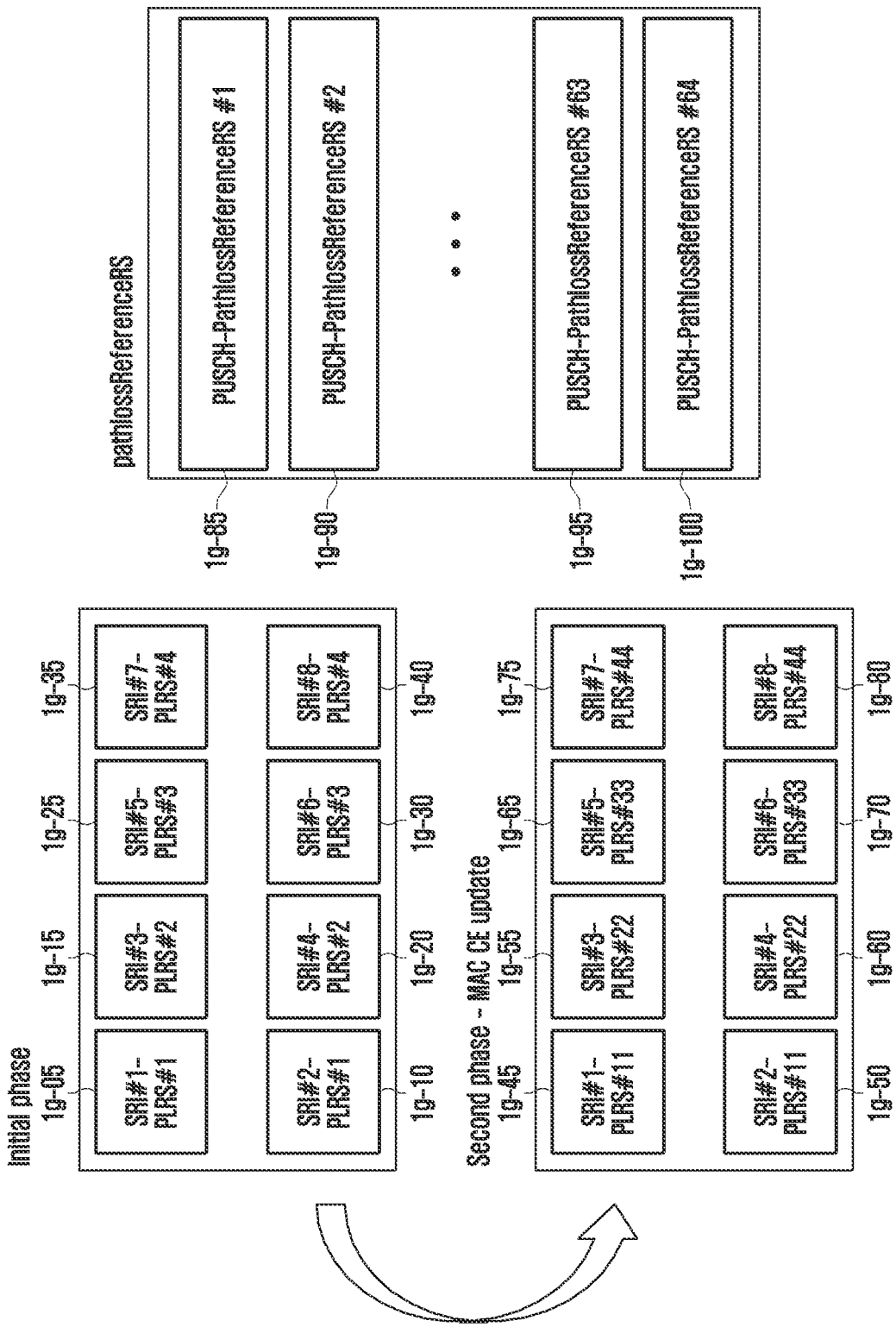
FIG. 1G illustrates types of measurement resources and a dynamic mapping update for a plurality of pathloss reference signals (RSs) configured in the PUSCH and a method of indicating valid resources in the NR system according to an embodiment of the disclosure.

FIG. 1G illustrates types of measurement resources and a dynamic mapping update for a plurality of pathloss reference signals (pathloss reference RSs) configured in the PUSCH and a method of indicating valid resources in the NR system according to an embodiment of the disclosure.

This FIGURE corresponds to additional function description for FIG. 1F and thus is described with reference to FIG. 1F.

For measurement of pathloss reference signals (pathloss reference RSs) applied to PUSCH transmission, a maximum of 64 pathloss reference signals (pathloss reference RSs) among a plurality of pathloss reference signals may be configured in PUSCH-Config through the RRC message. The UE may measure a maximum of 4 pathloss reference signal (pathloss reference RS) resources among the configured pathloss reference signals (pathloss reference RSs) and apply the measured pathloss to PUSCH transmission. That is, in order to calculate PUSCH transmission power, the UE may reflect a pathloss reference signal (pathloss reference RS) measurement value. For this, the number of (a maximum of 4) resources initially measured by the UE can be maintained even though a plurality of, that is, a maximum of 64 pathloss reference signal (pathloss reference RS) resources are configured through the RRC configuration. The operation related to the configuration and application of the pathloss reference signal (pathloss reference RS) used for PUSCH transmission is described below.

FIG. 1G illustrates a configuration for a maximum of 64 pathloss reference RSs which can be configured through PUSCH-Config of the RRC message, particularly, PUSCH-PathlossReferenceRS as indicated by reference numerals 1g-85 to 1g-100. Further, pathloss reference RSs associated with SRI indicators which can be initially configured through PUSCH-Config of the RRC message, particularly, SRI-PUSCH-PowerControl may be configured as indicated by reference numerals 1g-05 to 1g-40. As described above, mapping between the SRI indicator and the pathloss reference RS is configured through the RRC message and one pathloss reference RS used for actual PUSCH transmission may be indicated through the SRI indicator of DCI. At this time, mapping between the SRI indicator and the pathloss reference RS has no separate limitation, and a maximum number of pathloss reference RSs which can be configured may be 40. Thereafter, the pathloss reference RS to be measured may be updated through the MAC CE for updating mapping between the pathloss and the SRI, and the relationship therefor is indicated by reference numerals 1g-45 to 1g-80.

A detailed example is described below. 8 pieces of SRI mapping information may be initially configured through the RRC message, and each piece thereof may have the following mapping relations between the SRI and the pathloss reference RS.

SRI #1 is associated with Pathloss Reference RS #1
SRI #2 is associated with Pathloss Reference RS #1
SRI #3 is associated with Pathloss Reference RS #2
SRI #4 is associated with Pathloss Reference RS #2
SRI #5 is associated with Pathloss Reference RS #3
SRI #6 is associated with Pathloss Reference RS #3
SRI #7 is associated with Pathloss Reference RS #4
SRI #8 is associated with Pathloss Reference RS #4

Thereafter, the MAC CE is received and the following updated mapping relations between the SRI and the pathloss reference RS is established.

SRI #1 is associated with Pathloss Reference RS #11
SRI #2 is associated with Pathloss Reference RS #11
SRI #3 is associated with Pathloss Reference RS #21
SRI #4 is associated with Pathloss Reference RS #21
SRI #5 is associated with Pathloss Reference RS #33
SRI #6 is associated with Pathloss Reference RS #33
SRI #7 is associated with Pathloss Reference RS #44
SRI #8 is associated with Pathloss Reference RS #44

Through the introduction of the dynamic mapping update between the SRI and the pathloss reference RS, the previous procedure of updating the RRC configuration may be replaced and configuration information can be changed with low latency.

Figure 1H:
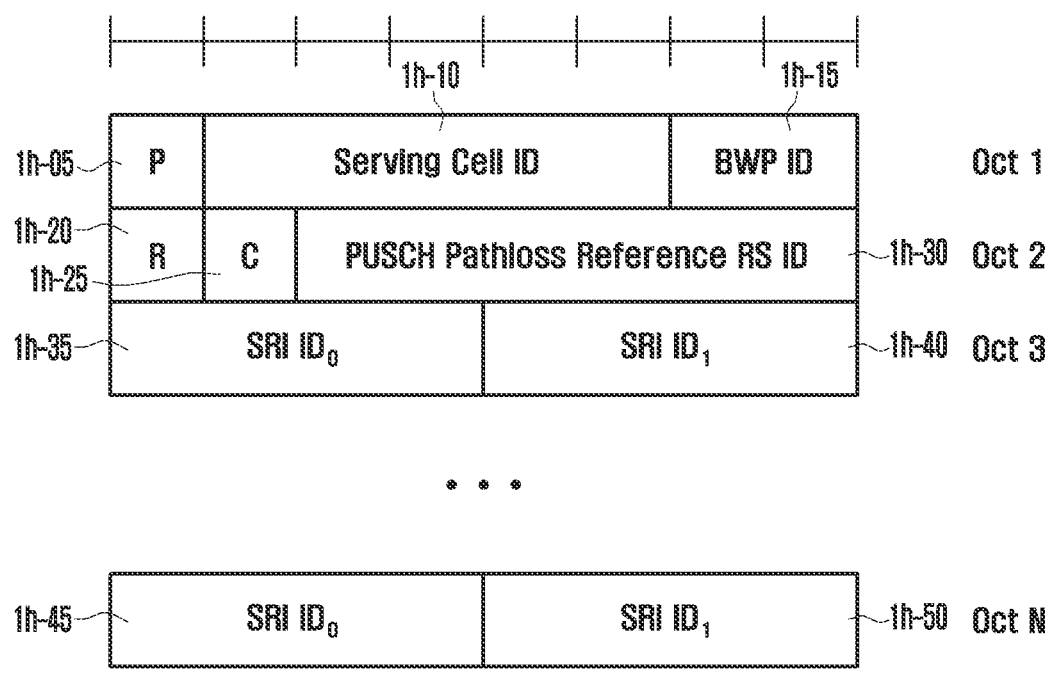
FIG. 1H illustrates a medium access controls (MAC) control element (CE) structure and a mapping method for dynamically updating pathloss RSs required to be measured in the NR system according to an embodiment of the disclosure.

FIG. 1H illustrates a MAC CE structure and a mapping method for dynamically updating pathloss reference signals (pathloss reference RSs) required to be measured in the NR system according to an embodiment of the disclosure.

Referring to FIG. 1H, a plurality of SRI indexes may be indicated for one pathloss reference signals (pathloss reference RSs), and transmission of a plurality of MAC CEs is needed to indicate updates of a plurality of pathloss reference RSs. A detailed MAC CE structure and relevant fields are described below.

Reserved bit indicator, R 1h-05 and 1h-20: has 1 bit and indicates a reserved bit Serving cell ID 1h-10: indicates an index of a serving cell and has 5 bits Bandwidth part (BWP) ID 1h-15: indicates a BWP index and has 2 bits C field 1h-25: is an indicator indicating whether there are a plurality of SRI IDs in the last octet.

Pathloss Reference RS index 1h-30: is a pathloss Reference RS index of 6 bits and indicates pathloss resources associated with the signaled SRI indicator.

SRI ID 1h-35, 1h-40, 1h-45, and 1h-50: is an index of an SRI indicator associated with the pathloss reference RS indicated by 4 bits.

FIG. 1I is a flowchart illustrating an operation of the UE for calculating pathloss by applying an indicated pathloss reference signal (pathloss reference RS) among pathloss reference signals (pathloss reference RSs) configured in the PUSCH in the NR system according to an embodiment of the disclosure.

Particularly, in the drawing, the operation of the conventional NR system is described, and may be referred to for an embodiment proposed in the disclosure thereafter.

The RRC-connected UE may receive PUSCH configuration information in operation 1i-05. The PUSCH configuration information may include at least one of pathloss reference RS configuration information required for determining the signal strength and power for PUSCH transmission and configuration information for the correlation between the SRI and the pathloss reference RS. Detailed configuration information and UE operation have been described in detail with reference to FIGS. 1F to 1H.

In operation 1i-10, the UE may perform L3 measurement for 4 pathloss reference RS resources which was initially configured among a maximum of 64 pathloss reference RS resources configured in operation 1i-05 and store and manage the corresponding measurement value.

In operation 1i-15, the UE may receive a MAC CE (see FIG. 1H) including mapping update information between the pathloss reference RS and the SRI from the BS and update the pathloss reference RS resources to be measured according to mapping information of the received MAC CE and start measurement.

In operation 1i-20, the UE may receive DCI indicating scheduling for uplink transmission (PUSCH) from the BS. When the BS indicates scheduling for uplink transmission (PUSCH) of the UE, not only scheduling resource information but also a specific pathloss reference RS applied to calculate the signal strength and power for the corresponding transmission may be indicated through DCI. That is, the pathloss reference RS mapped to the SRI indicator of the DCI may be indicated.

In operation 1*i*-25, the UE may measure the corresponding pathloss reference RS resource to calculate the pathloss and determine power of PUSCH transmission. For example, the UE may determine PUSCH transmission power through Equation 1 above on the basis of the calculated pathloss.

Figure 1J:
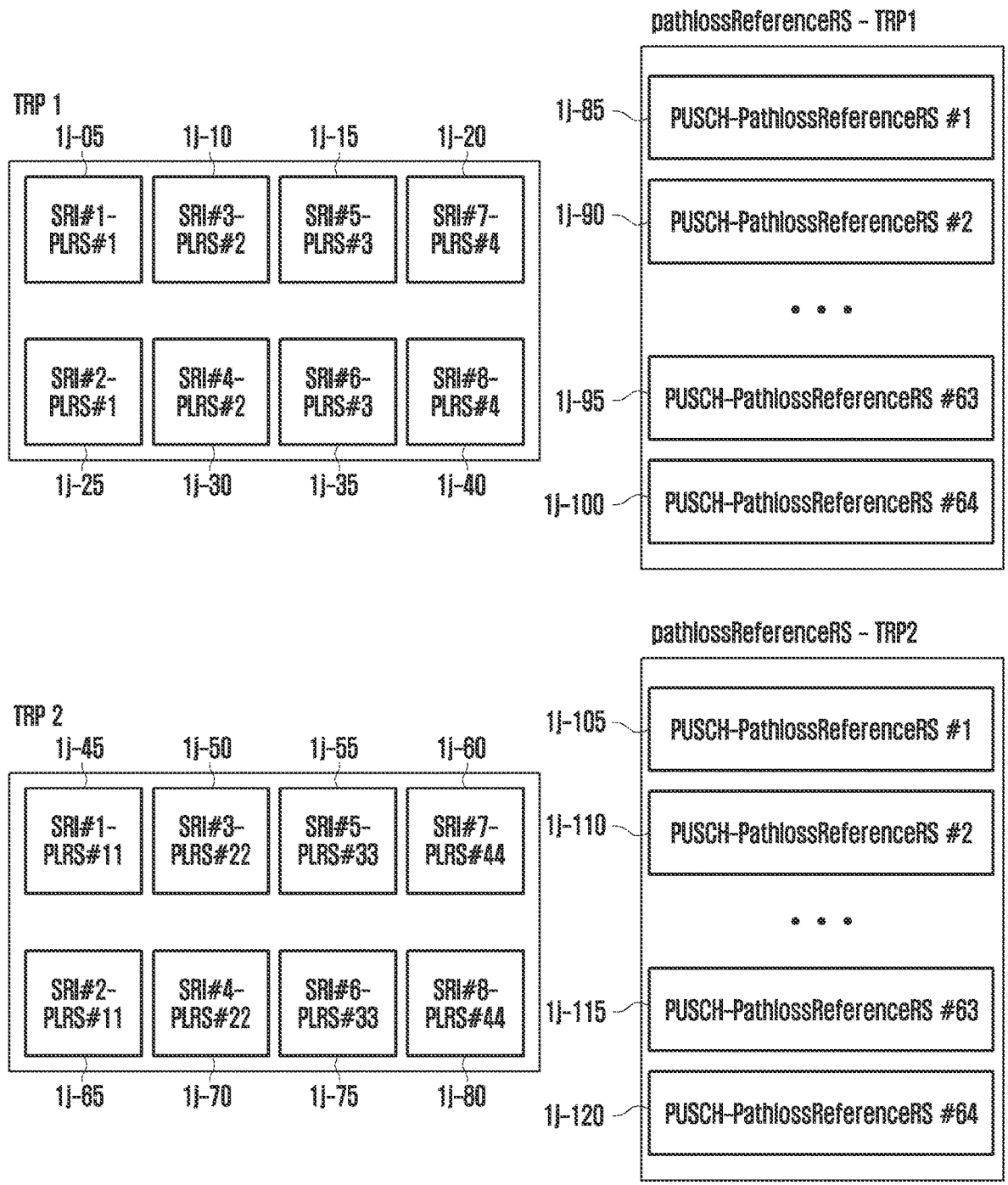
FIG. 1J illustrates a method of configuring types of measurement resources for a plurality of pathloss RSs configured in the PUSCH for each TRP according to an embodiment of the disclosure.

FIG. 1J illustrates a method of configuring a type of measurement resources for a plurality of pathloss reference signals (pathloss reference RSs) configured in the PUSCH for each TRP according to an embodiment 1 of the disclosure.

FIG. 1F has described that a maximum of 64 (4 in Rel-15) pathloss reference signal (pathloss reference RS) resources which are available in PUSCH-Config can be configured through the RRC message for measurement of pathloss reference signals (pathloss reference RSs) applied to PUSCH transmission, and the UE measures the 4 configured pathloss reference signals (pathloss reference RSs) among them and applies the same to PUSCH transmission. In the embodiment, a method of independently configuring and measuring pathloss reference signals (pathloss reference RSs) of respective paths for a plurality of TRPs is described. At this time, one of the three options below may be configured. Hereinafter, the following description is made on the basis of two TRPs (TRP 1 and TRP 2) for convenience of description, but the method proposed in the disclosure may also be similarly applied to a scenario in which two or more TRPs exist.

1. Option 1: two pathloss reference signal configurations (pathlossReferenceRS) and two SRI mapping configurations (sri-PUSCH-MappingToAddModList)

A new pathloss reference signal configuration and SRI mapping list configuration (or the configuration may be expanded to two or more) dedicated for TRP 2.

Pathloss Reference RS configuration: follows the structure described with reference to FIG. 1F, and resource configurations 1*j*-85, 1*j*-90, 1*j*-95, and 1*j*-100 for TRP 1 and resource configurations 1*j*-105, 1*j*-110, 1*j*-115, and 1*j*-120 for TRP 2 may be provided in independent structures.

Mapping configurations between SRI bit and pathloss reference RS: mapping configurations (SRI-PUSCH-PowerControl, a maximum of 16 mapping) with pathloss reference signals (pathloss reference RSs) used for actual PUSCH transmission which can be indicated through an SRS resource indicator (SRI) bit of dynamic control information (DCI) may be independently provided for each TRP.

Mapping configurations for TRP 1 1*j*-05, 1*j*-10, 1*j*-15 1*j*-20, 1*j*-25, 1*j*-30, 1*j*-35, and 1*j*-40:
SRI #1 is associated with Pathloss Reference RS #1
SRI #2 is associated with Pathloss Reference RS #1
SRI #3 is associated with Pathloss Reference RS #2
SRI #4 is associated with Pathloss Reference RS #2
SRI #5 is associated with Pathloss Reference RS #3
SRI #6 is associated with Pathloss Reference RS #3
SRI #7 is associated with Pathloss Reference RS #4
SRI #8 is associated with Pathloss Reference RS #4

Mapping configurations for TRP 2 1*j*-45, 1*j*-50, 1*j*-55 1*j*-60, 1*j*-65, 1*j*-70, 1*j*-75, and 1*j*-80:
SRI #1 is associated with Pathloss Reference RS #11
SRI #2 is associated with Pathloss Reference RS #11
SRI #3 is associated with Pathloss Reference RS #22
SRI #4 is associated with Pathloss Reference RS #22
SRI #5 is associated with Pathloss Reference RS #33
SRI #6 is associated with Pathloss Reference RS #33
SRI #7 is associated with Pathloss Reference RS #44
SRI #8 is associated with Pathloss Reference RS #44

TRP2-dedicated MAC CE signaling (detailed operation is described below)

2. Option 2: two SRI mapping configurations (sri-PUSCH-MappingToAddModList) and one pathloss reference signal configuration (pathlossReferenceRS)

TRP2-dedicated SRI mapping list configuration (or the configuration may be expanded to two or more). For the pathloss reference signal configuration (pathlossReferenceRS), TRP1 and TRP2 may share the existing list. This is a method of identically maintaining the reference signal configuration in one cell and separately managing only the mapping relationship with the SRI for each TRP.

Pathloss Reference RS configurations: follow the structure described with reference to FIG. 1F and correspond to a method of equally applying the resource configurations for TRP1 1*j*-85, 1*j*-90, 1*j*-95, and 1*j*-100 to TRP2. That is, resource configurations for TRP2 1*j*-105, 1*j*-110, 1*j*-115, and 1*j*-120 are not separately provided in option 2.

Mapping configuration between SRI bit and pathloss reference RS: mapping configurations (SRI-PUSCH-PowerControl, a maximum of 16 mapping) with pathloss reference signals (pathloss reference RSs) used for actual PUSCH transmission which can be indicated through an SRS resource indicator (SRI) bit of dynamic control information (DCI) may be independently provided for each TRP. At this time, resource indexes of mapping configurations for TRP1 1*j*-05, 1*j*-10, 1*j*-15 1*j*-20, 1*j*-25, 1*j*-30, 1*j*-35, and 1*j*-40 may be applied to the pathloss reference signal configurations (pathlossReferenceRS) applied to mapping.

Mapping configurations for TRP1 1*j*-05, 1*j*-10, 1*j*-15 1*j*-20, 1*j*-25, 1*j*-30, 1*j*-35, and 1*j*-40:
SRI #1 is associated with Pathloss Reference RS #1
SRI #2 is associated with Pathloss Reference RS #1
SRI #3 is associated with Pathloss Reference RS #2
SRI #4 is associated with Pathloss Reference RS #2
SRI #5 is associated with Pathloss Reference RS #3
SRI #6 is associated with Pathloss Reference RS #3
SRI #7 is associated with Pathloss Reference RS #4
SRI #8 is associated with Pathloss Reference RS #4

Mapping configurations for TRP2 1*j*-45, 1*j*-50, 1*j*-55 1*j*-60, 1*j*-65, 1*j*-70, 1*j*-75, and 1*j*-80:
SRI #1 is associated with Pathloss Reference RS #11
SRI #2 is associated with Pathloss Reference RS #11
SRI #3 is associated with Pathloss Reference RS #22
SRI #4 is associated with Pathloss Reference RS #22
SRI #5 is associated with Pathloss Reference RS #33
SRI #6 is associated with Pathloss Reference RS #33
SRI #7 is associated with Pathloss Reference RS #44
SRI #8 is associated with Pathloss Reference RS #44

TRP2-dedicated MAC CE signaling (detailed operation is described below)

3. Option 3: provides information on the mapping relationship for each TRP within the existing SRI mapping configuration list (sri-PUSCH-MappingToAddModList) and makes one pathloss reference signal configuration (pathlossReferenceRS)

TRP2-dedicated configuration information is included in the SRI mapping list (or the configuration may be expanded to two or more) and, for the pathloss reference signal configuration (pathlossReferenceRS), TRP1 and TRP2 may share the existing list. This is a method of identically maintaining the reference signal configuration in one cell and separately managing only the mapping relationship with the SRI for each TRP.

Pathloss Reference RS configurations: follow the structure described with reference to FIG. 1F and correspond to a method of equally applying the resource configurations for TRP1 1*j*-85, 1*j*-90, 1*j*-95, and 1*j*-100 to TRP2. That is, resource configurations for TRP2 1*j*-105, 1*j*-110, 1*j*-115, and 1*j*-120 are not separately provided in option 2.

Mapping configurations between SRI bit and pathloss reference RS: mapping configurations (SRI-PUSCH-PowerControl, a maximum of 16 mapping) with pathloss reference signals (pathloss reference RSs) used for actual PUSCH transmission which can be indicated through an SRS resource indicator (SRI) bit of dynamic control information (DCI) for each TRP may be additionally divided and provided within the existing IE. At this time, resource indexes of mapping configurations for TRP1 1*j*-05, 1*j*-10, 1*j*-15 1*j*-20, 1*j*-25, 1*j*-30, 1*j*-35, and 1*j*-40 may be applied to the pathloss reference signal configurations (pathlossReferenceRS) applied to mapping.

Mapping configurations for TRP1 1*j*-05, 1*j*-10, 1*j*-15 1*j*-20, 1*j*-25, 1*j*-30, 1*j*-35, and 1*j*-40:
SRI #1 is associated with Pathloss Reference RS #1
SRI #2 is associated with Pathloss Reference RS #1
SRI #3 is associated with Pathloss Reference RS #2
SRI #4 is associated with Pathloss Reference RS #2
SRI #5 is associated with Pathloss Reference RS #3
SRI #6 is associated with Pathloss Reference RS #3
SRI #7 is associated with Pathloss Reference RS #4
SRI #8 is associated with Pathloss Reference RS #4

Mapping configurations for TRP2 1*j*-45, 1*j*-50, 1*j*-55 1*j*-60, 1*j*-65, 1*j*-70, 1*j*-75, and 1*j*-80:
SRI #1 is associated with Pathloss Reference RS #11
SRI #2 is associated with Pathloss Reference RS #11
SRI #3 is associated with Pathloss Reference RS #22
SRI #4 is associated with Pathloss Reference RS #22
SRI #5 is associated with Pathloss Reference RS #33
SRI #6 is associated with Pathloss Reference RS #33
SRI #7 is associated with Pathloss Reference RS #44
SRI #8 is associated with Pathloss Reference RS #44

TRP2-dedicated MAC CE signaling (detailed operation is described below).

Figure 1K:
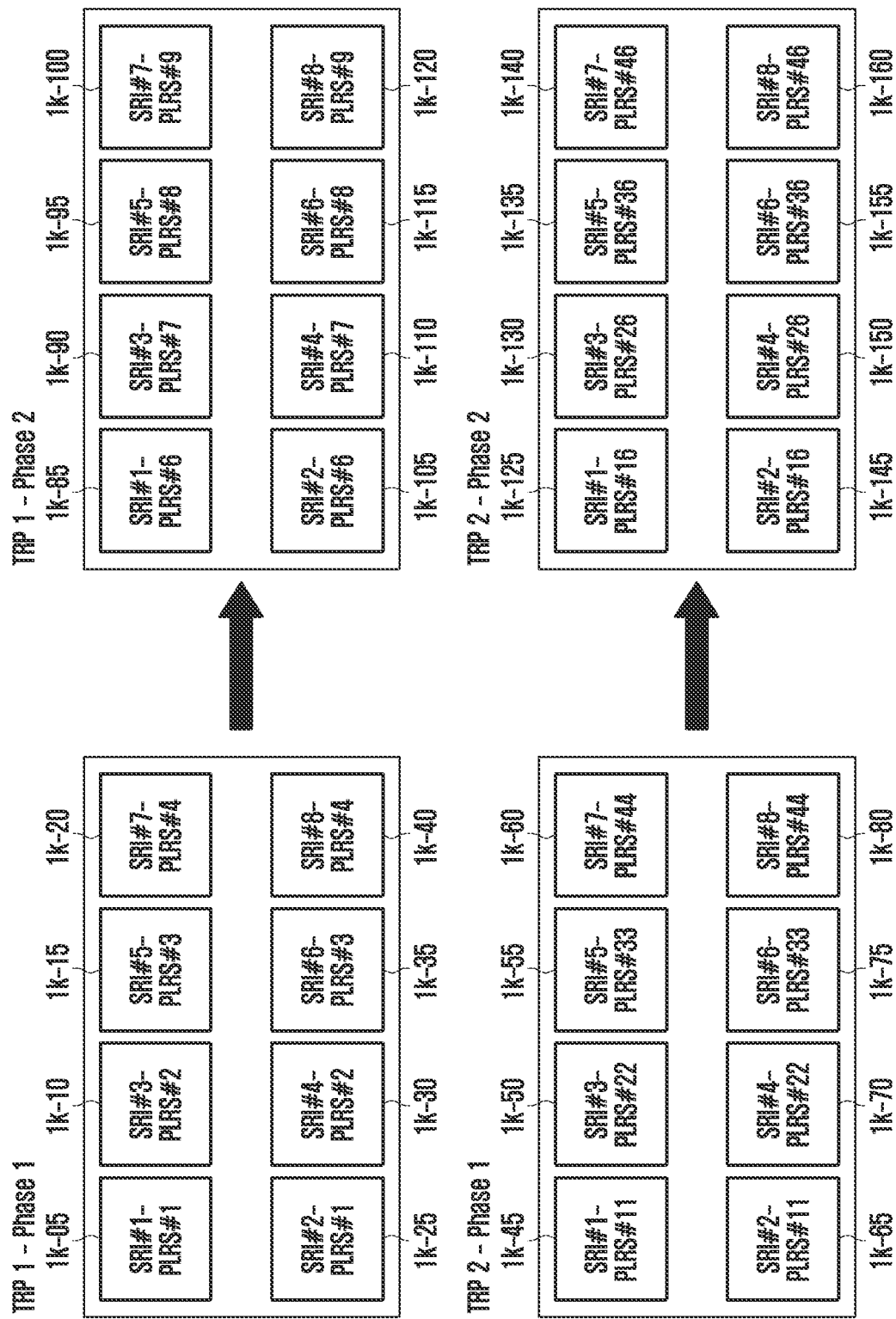
FIG. 1K illustrates types of measurement resources and a dynamic mapping update method for a plurality of pathloss RSs for a plurality of TRPs configured in the physical uplink control channel (PUCCH) according to an embodiment of the disclosure.

FIG. 1K illustrates types of measurement resources and a dynamic mapping update method for a plurality of pathloss reference signals (pathloss reference RSs) for a plurality of TRPs configured in the PUCCH according to an embodiment 1 of the disclosure.

Figure 1M:
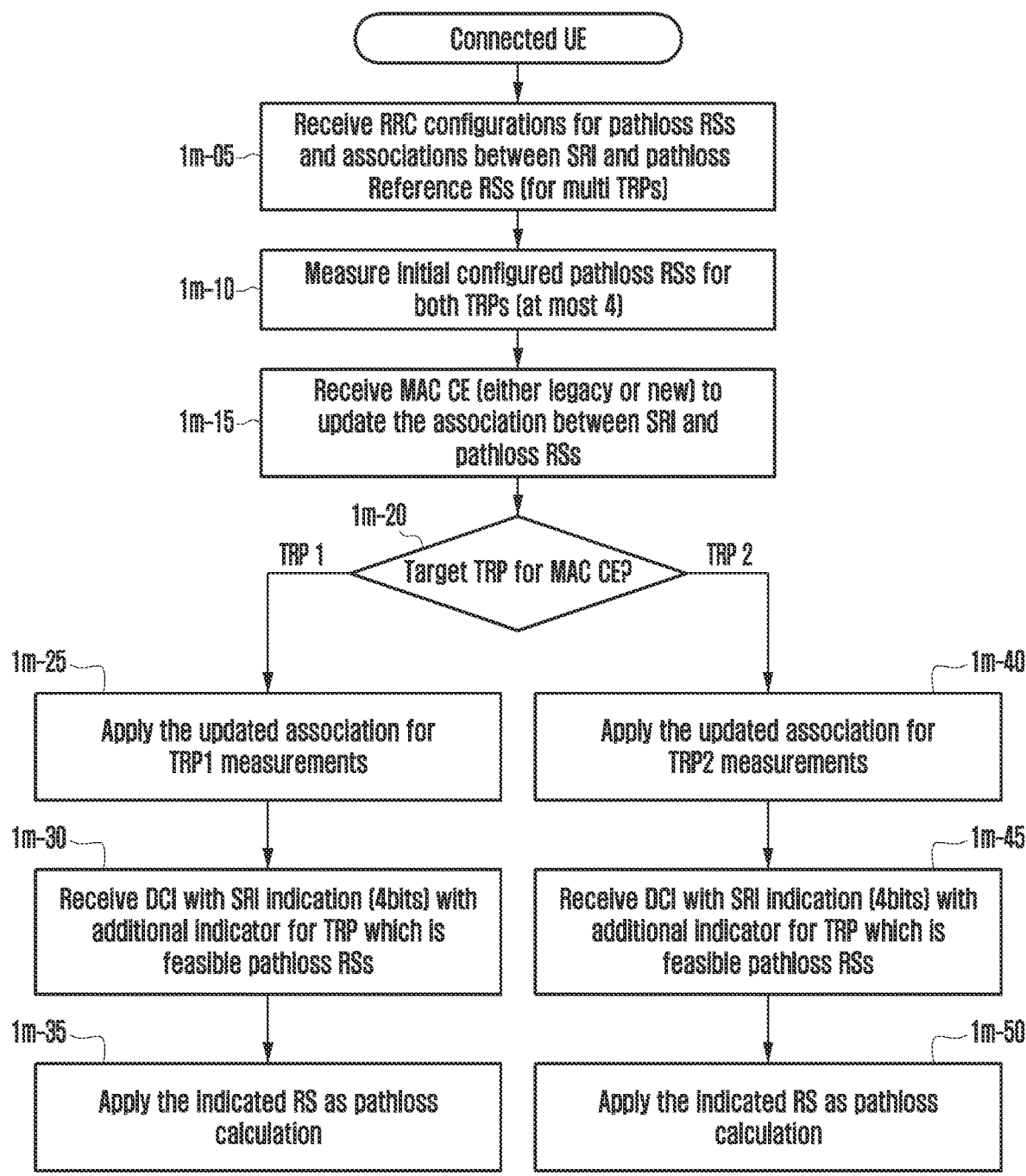
FIG. 1M is a flowchart illustrating a UE operation according to an embodiment of the disclosure.
Figure 1N:
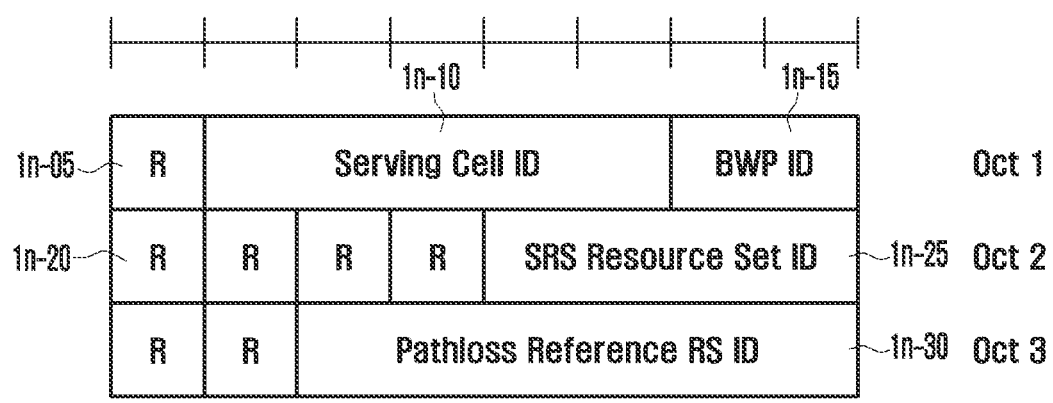
FIG. 1N illustrates a MAC CE structure and a mapping method for dynamically updating pathloss RSs required to be measured for pathloss RSs configured in SRS transmission in the NR system according to an embodiment of the disclosure.
Figure 10:
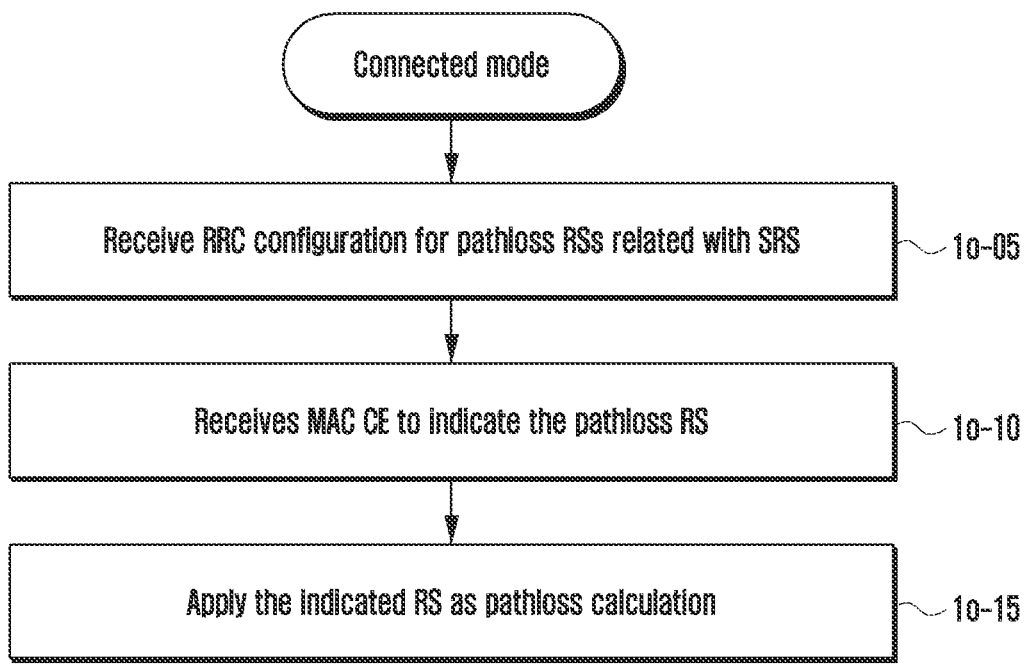
Figure 1Q:
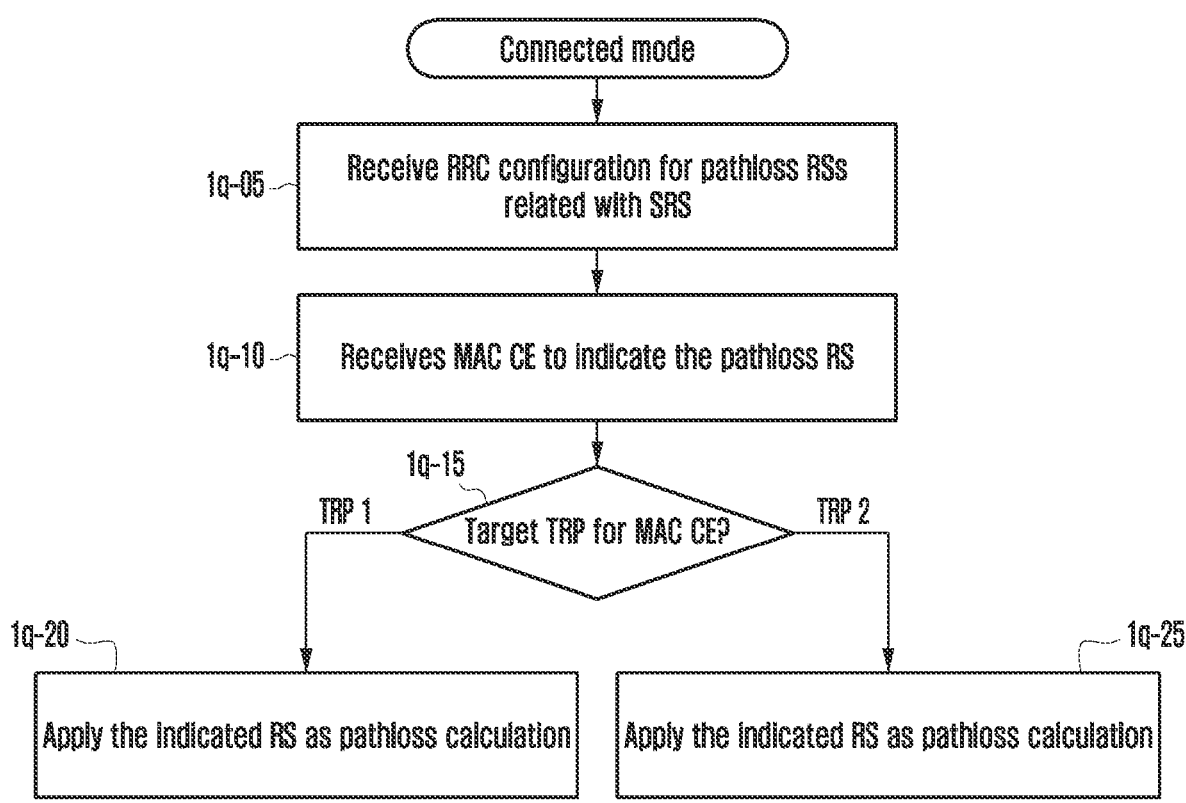
FIG. 1Q is a flowchart illustrating an operation of the UE according to an embodiment of the disclosure.
Figure 1R:
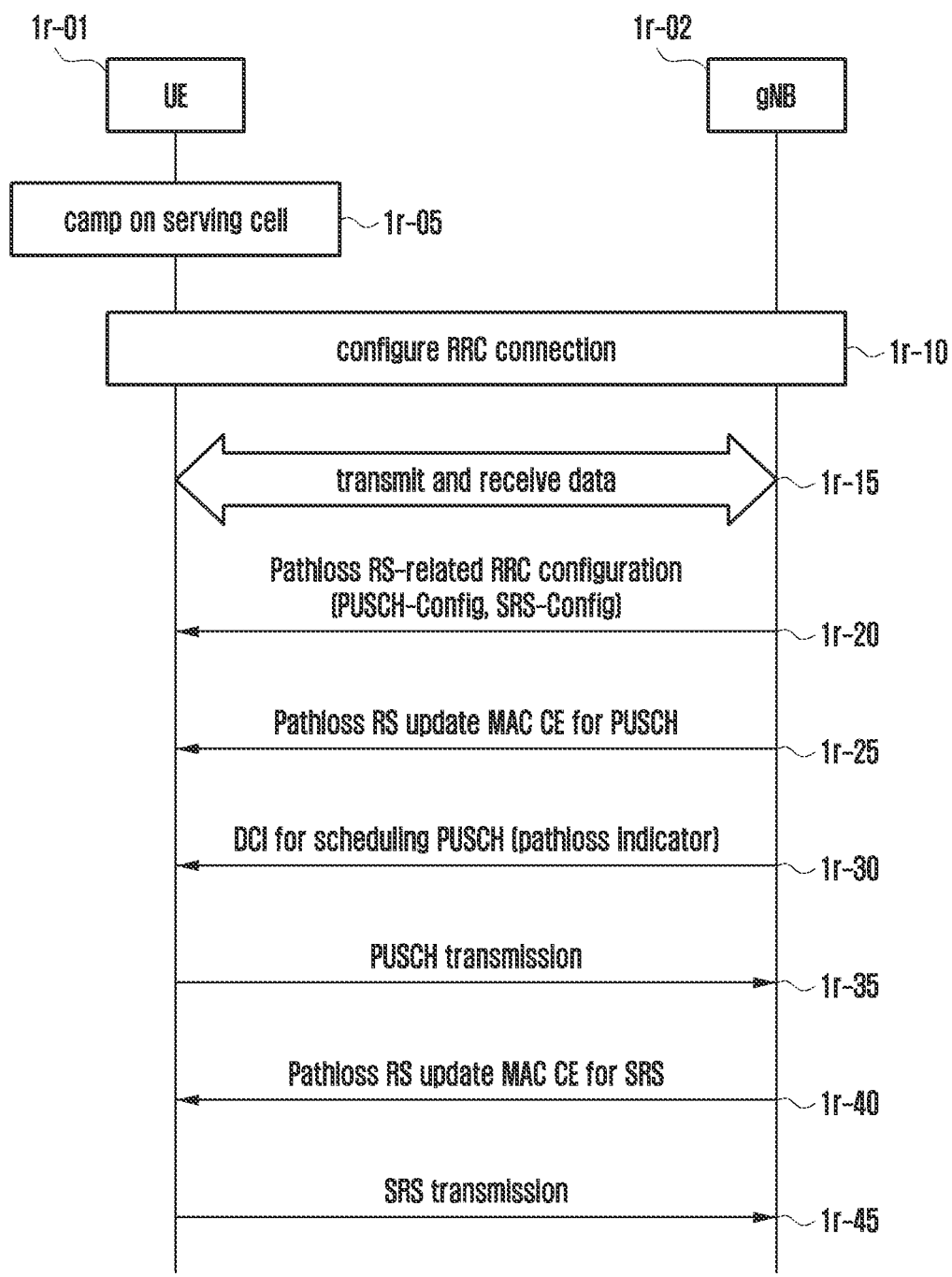
FIG. 1R is a sequence diagram illustrating operations of the UE and the gNB to which embodiments of the disclosure can be applied according to an embodiment of the disclosure.
Figure 1S:
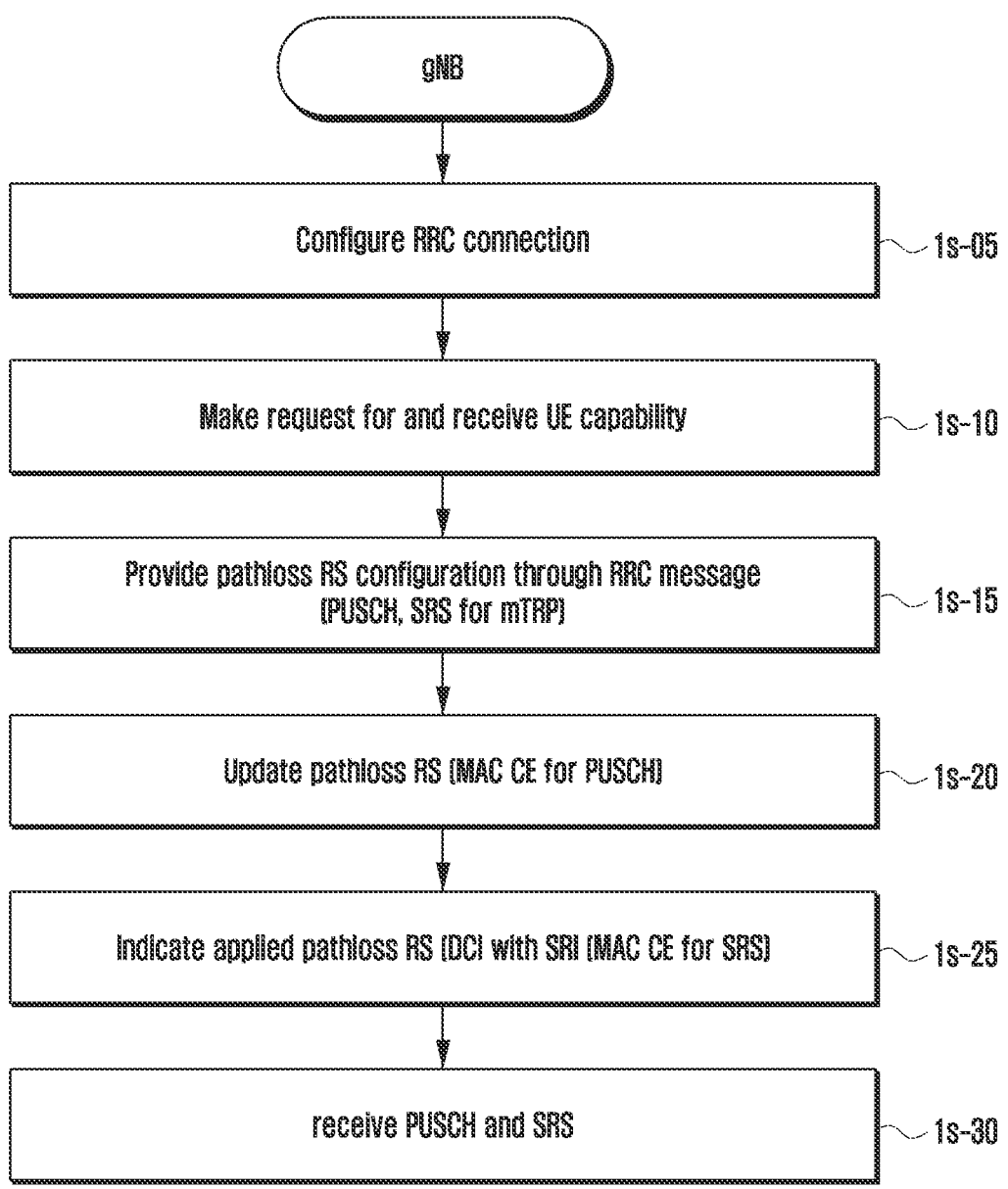
FIG. 1S is a flowchart illustrating an operation of a next generation Node B (gNB) according to an embodiment of the disclosure.

This FIGURE corresponds to additional function description of FIGS. 1J and 1*s* described on the basis of FIG. 1J.

In the measurement of pathloss reference signals (pathloss reference RSs) applied to PUSCH transmission, a maximum of 64 pathloss reference signal resources among a plurality of pathloss reference signal (pathloss reference RS) resources may be configured for each TRP or in common for the TRPs in PUSCH configuration information (for example, PUSCH-Config) included in the RRC message. The UE may measure a maximum of 4 pathloss reference signal (pathloss reference RS) resources among the configured pathloss reference signals (pathloss reference RSs) and apply the same to PUSCH transmission in each TRP. That is, in order to calculate PUSCH transmission power, the UE may reflect a pathloss reference signal (pathloss reference RS) measurement value. For this, the number of (a maximum of 4) resources initially measured by the UE can be maintained even though a plurality of, that is, a maximum of 64 pathloss reference signal (pathloss reference RS) resources are configured through the RRC configuration. The operation related to the configuration and application of the pathloss reference signal (pathloss reference RS) used for PUSCH transmission is described below.

As illustrated in FIG. 1J, the plurality of pathloss reference signals may be configured for each TRP or in common for TRPs through PUSCH-Config of the RRC message, particularly, PUSCH-PathlossReferenceRS. Further, pathloss reference RSs associated with SRI indicators which can be initially configured through PUSCH-Config of the RRC message, particularly, SRI-PUSCH-PowerControl may be configured as indicated by reference numerals 1*k*-05 to 1*k*-40. In this FIGURE, reference numerals 1*k*-05 to 1*k*-40 may indicate mapping information between SRIs and pathloss reference signals for TRP1. As described above, mapping between the SRI indicator and the pathloss reference RS is configured through the RRC message and one pathloss reference RS used for actual PUSCH transmission may be indicated through the SRI indicator of DCI. Mapping between the SRI indicator and the pathloss reference RS has no separate limitation, and a maximum number of pathloss reference RSs which can be configured may be 4. Thereafter, the pathloss reference RS to be measured may be updated through the MAC CE for updating mapping between the pathloss and the SRI, and the relationship therefor is indicated by reference numerals 1*k*-85 to 1*k*-120.

Similarly, mapping between the SRI indicator and the pathloss reference RS for TRP2 may be configured as indicated by reference numerals 1*k*-45 to 1*k*-80. They may be independently managed through the mapping configuration (list) between the separate SRI and the pathloss reference RS as described in FIG. 1J. As described above, mapping between the SRI indicator and the pathloss reference RS is configured through the RRC message and one pathloss reference RS used for actual PUSCH transmission may be indicated through the SRI of DCI. Thereafter, the pathloss reference RS to be measured may be independently updated in TRP2 through the MAC CE for updating mapping between the pathloss and the SRI, and the relationship therefor is indicated by reference numerals 1*k*-125 to 1*k*-160. For reference, signaling for TRP division may be added by the SRI indication through DCI in the disclosure. This is possible through a separate bit (a new indicator or rule of the existing bits) of DCI, or DCI received through a specific TRP path may be a method applied to the corresponding TRP.

A detailed example is described below. For TRP1, 8 pieces of SRI mapping information may be initially configured through the RRC message, and each piece thereof may have the mapping relationship with the pathloss reference RS shown below.
SRI #1 is associated with Pathloss Reference RS #1
SRI #2 is associated with Pathloss Reference RS #1
SRI #3 is associated with Pathloss Reference RS #2
SRI #4 is associated with Pathloss Reference RS #2
SRI #5 is associated with Pathloss Reference RS #3
SRI #6 is associated with Pathloss Reference RS #3
SRI #7 is associated with Pathloss Reference RS #4
SRI #8 is associated with Pathloss Reference RS #4

Thereafter, the MAC CE for updating the mapping relationship between the SRI and the pathloss reference RS for TRP1 may be received and, for example, the following updated mapping relation between the SRI and the pathloss reference RS may be established.

SRI #1 is associated with Pathloss Reference RS #6
SRI #2 is associated with Pathloss Reference RS #6
SRI #3 is associated with Pathloss Reference RS #7
SRI #4 is associated with Pathloss Reference RS #7
SRI #5 is associated with Pathloss Reference RS #8
SRI #6 is associated with Pathloss Reference RS #8
SRI #7 is associated with Pathloss Reference RS #9
SRI #8 is associated with Pathloss Reference RS #9

Separately (independently) from the operation, 8 pieces of mapping information may be initially configured through the RRC message for TRP2, and each piece thereof may have the following mapping relation with the pathloss reference RS.

SRI #1 is associated with Pathloss Reference RS #11
SRI #2 is associated with Pathloss Reference RS #11
SRI #3 is associated with Pathloss Reference RS #22
SRI #4 is associated with Pathloss Reference RS #22
SRI #5 is associated with Pathloss Reference RS #33
SRI #6 is associated with Pathloss Reference RS #33
SRI #7 is associated with Pathloss Reference RS #44
SRI #8 is associated with Pathloss Reference RS #44

Thereafter, the MAC CE for updating the mapping relationship between the SRI and the pathloss reference RS for TRP2 may be received and, for example, the following updated mapping relation between the SRI and the pathloss reference RS may be established.

SRI #1 is associated with Pathloss Reference RS #16
SRI #2 is associated with Pathloss Reference RS #16
SRI #3 is associated with Pathloss Reference RS #26
SRI #4 is associated with Pathloss Reference RS #26
SRI #5 is associated with Pathloss Reference RS #36
SRI #6 is associated with Pathloss Reference RS #36
SRI #7 is associated with Pathloss Reference RS #46
SRI #8 is associated with Pathloss Reference RS #46

FIG. 1L illustrates the structure of the MAC CE for dynamically updating mapping between pathloss reference signals (pathloss reference RSs) for a plurality of TRPs and SRIs and a mapping method according to an embodiment 1 of the disclosure.

The MAC CE structure proposed in FIG. 11 is to dynamically update mapping between pathloss reference signals (pathloss reference RSs) and SRIs for a new TRP. Mapping information for a plurality of SRI indexes to which pathloss reference signals (pathloss reference RSs) indicated through the MAC CE structure may be simultaneously updated. That is, in order to indicate the update for a plurality of pathloss reference RSs, transmission of a plurality of MAC CEs is needed. A detailed MAC CE structure and relevant fields are described below. Hereinafter, the following description is made on the basis of two TRPs (TRP 1 and TRP 2) for convenience of description, but the method proposed in the disclosure may also be similarly applied to a scenario in which two or more TRPs exist.

1. Option 1: method of expanding the existing mapping MAC CE between the pathloss reference signal and the SRI and applying the same to TRP2. In option 1, a logical channel identifier (LCID) of the existing MAC CE is identically used, and a reserved bit may be changed to a T field and used to identify TRP2.

T field 1*l*-05: has 1 bit and corresponds to an indicator indicating the application to TRP1 or TRP2. The application is mode to TRP1 when the T field is 0, and is made to TRP2 when the T field is 1.
Serving cell ID 1*l*-10: indicates an index of a serving cell and has 5 bits
BWP ID 1*l*-15: indicates a BWP index and has 2 bits
Reserved bit (R) 1*l*-20: reserved bit C field 1*l*-25: indicator indicating whether there are a plurality of SRI IDs in the last octet.
■ Pathloss Reference RS ID 1*l*-30: index of the pathloss reference signal updated to be associated with the indicated SRI. It has an ID of 6 bits, and the length may vary depending on the number of supported resources.
SRI ID 1*l*-35, 1*l*-40, 1*l*-45, or 1*l*-50: has 4 bits may corresponds to an index of an SRI indicator associated with the pathloss reference RS.

2. Option 2: method of introducing a new MAC CE and applying the same to TRP2. In option 2, an LCID different from the LCID value of the existing MAC CE is allocated and may be used to identify TRP2. The structure of the MAC CE may be the same as the structure described with reference to FIG. 1H. Further, the LCID allocated to the corresponding MAC CE may be an LCID of 6 bits or an eLCID in a 2-octet structure.

Reserved bit (R) 1*l*-55 and 1*l*-70: reserved bit
Serving cell ID 1*l*-60: indicates an index of a serving cell and has 5 bits
BWP ID 1*l*-65: indicates a BWP index and has 2 bits
C field 1*l*-75: indicator indicating whether there are a plurality of SRI IDs in the last octet.
Pathloss Reference RS ID 1*l*-80: index of the pathloss reference signal updated to be associated with the indicated SRI. It has an ID of 6 bits, and the length may vary depending on the number of supported resources.
SRI ID 1*l*-85, 1*l*-90, 1*l*-95, or 1*l*-100: has 4 bits may corresponds to an index of an SRI indicator associated with the pathloss reference RS.

FIG. 1M is a flowchart illustrating a UE operation according to an embodiment 1 of the disclosure.

The RRC-connected UE may receive PUSCH configuration information in operation 1*m*-05. The PUSCH configuration information may include at least one of pathloss reference RS configuration information required for determining the signal strength and power for PUSCH transmission for a plurality of TRPs and configuration information for the correlation between the SRI and the pathloss reference RS. Further, pathloss reference RSs associated with SRI indicators which can be initially configured through PUSCH-Config of the RRC message, particularly, SRI-PUSCH-PowerControl may be configured. As described above, when mapping between the SRI indicator and the pathloss reference RS is configured through the RRC message and the MAC CE indicating the update of the corresponding mapping is received, the mapping of the pathloss reference RS associated with the SRI indicator may be updated. Thereafter, one pathloss reference RS used for actual PUSCH transmission may be indicated through the SRI indicator of DCI. Mapping between the SRI indicator and the pathloss reference RS has no separate limitation, and a maximum number of pathloss reference RSs which can be configured may be 4. The detailed configuration information and operation have been described in detail with reference to FIGS. 1J and 1K.

In operation 1*m*-10, the UE may perform L3 measurement for a maximum of four pathloss reference RS resources, required to be initially measured, which are configured in operation 1*m*-05 and store and manage the corresponding measurement value. When pathloss reference RSs for a plurality of TRPs are configured in operation 1*m*-05, the UE may measure the pathloss reference RSs for each TRP and store measurement values. At this time, a maximum number of pathloss reference RSs which can be measured may be 4 for each of TRP1 and TRP2, may be 4 for all of TRP1 and TRP2, or may be different therefor.

In operation 1m-15, the UE may receive a pathloss reference RS update MAC CE for updating mapping between the pathloss reference RS and the SRI indicator through the BS and may perform the update and management as information indicated by the MAC CE. In operation 1m-15, the UE may measure the pathloss reference RS during a transition time according to a previous mapping rule, measure the pathloss reference RS configured according to a newly changed mapping rule after a predetermined transition time, and reflect the same in uplink transmission. This is because measurement of the pathloss reference RS is based on L3 measurement and thus a measurement value cannot be immediately changed through the MAC CE and an average value should be calculated through the application of a previous measurement value. FIGS. 1J to 1L may be referred to for detailed MAC CE structure and information, and a detailed operation. Particularly, in the corresponding operation, the UE may receive the MAC CE for updating the correlation between the pathloss reference RS and the SRI for each TRP, and thus the following operations are needed to be different.

In operation 1m-20, the UE may analyze the received MAC CE (or identify the LCID) and determine which TRP is for the corresponding MAC CE.

When the received MAC CE is a pathloss reference RS update MAC CE for TRP1 (or the existing pathloss reference RS update MAC CE when there is no update configuration for each TRP), the UE may measure the pathloss reference RS by applying the corresponding update in operation 1m-25. Thereafter, in operation 1m-30, the UE may receive scheduling for uplink transmission (PUSCH) from the BS through DCI, and corresponding control information may not only include scheduling resource information but also indicate a specific pathloss reference RS applied to calculation of the signal strength and power for the corresponding transmission. That is, the pathloss reference RS mapped to the SRI indicator of DCI may be indicated, and the UE may reflect pathloss to determine power of the PUSCH transmission signal by applying a value calculated for the corresponding pathloss reference RS resource in operation 1m-35. The DCI of operation 1m-30 may include an indicator of the TRP or information implying the same.

When the received MAC CE is a pathloss reference RS update MAC CE for TRP2, the UE may measure the pathloss reference RS for TRP2 by applying the corresponding update in operation 1m-40. Thereafter, in operation 1m-45, the UE may receive scheduling for uplink transmission (PUSCH) from the BS through DCI, and corresponding control information may not only include scheduling resource information but also indicate a specific pathloss reference RS applied to calculation of the signal strength and power for the corresponding transmission. That is, the pathloss reference RS mapped to the SRI indicator of DCI may be indicated, and the UE may reflect pathloss to determine power of the PUSCH transmission signal by applying a value calculated for the corresponding pathloss reference RS resource in operation 1m-50. The DCI of operation 1m-45 may include an indicator of the TRP2 or information implying the same.

FIG. 1N illustrates a MAC CE structure and a mapping method for dynamically updating pathloss reference signals (pathloss reference RSs) required to be measured for pathloss reference signals (pathloss reference RSs) configured in SRS transmission in the NR system according to an embodiment of the disclosure.

The UE may configure a plurality of pathloss reference RS resources within SRS configuration information (for example, SRS-Config or SRS-ResourceSet configuration) of the RRC message. Further, an indicator for an initial pathloss resource required to be initially measured is needed. For example, an expanded pathloss reference RS configuration using the previously used field as an initial value may be used for dynamic resource update through the MAC CE. Thereafter, when it is needed to update resources for measuring the pathloss reference RS required for calculating transmission power through the application of SRS transmission, the update may be performed to one of a plurality of pathloss reference RSs through the MAC CE. The following structure is referred to.

Reserved bit 1n-05 and 1n-20
Serving cell ID 1n-10 including SRS resource set: 5 bits
BWP ID 1n-15 including SRS resource set ID: 2 bits
SRS Resource Set ID 1n-25: 4 bits
Pathloss RS index 1n-30: 6 bits, pathloss reference RS resource information indicating dynamic changes to the UE FIG. 1O is a flowchart illustrating an operation of the UE for calculating pathloss by applying an indicated pathloss reference signal (pathloss reference RS) among pathloss reference signals (pathloss reference RSs) configured in SRS transmission in the NR system.

The RRC connected UE may receive configuration information for SRS resources in operation 1o-05, and the configuration information for the SRS resources may include pathloss reference RS configuration information required for determining the signal strength and power of SRS resource transmission. Pathloss reference RS configuration information applied to one SRS resource set may be provided through SRS-Config of the RRC message, particularly SRS-ResourceSet, and one pathloss reference RS may be conventionally configured through the RRC message but a maximum of 64 resources may be configured. ASN.1 shown in Table 2 below is related to a pathloss reference RS configuration method for SRS transmission based on Rel-16, and a plurality of pathloss reference RS configurations may be expanded and added within SRS-ResourceSet.

TABLE 2

```
SRS-ResourceSet ::=                      SEQUENCE {
    srs-ResourceSetId                    SRS-ResourceSetid,
    srs-ResourceIdList                   SEQUENCE (SIZE(1..maxNrofSRS-
ResourcesPerSet)) OF SRS-ResourceId     OPTIONAL,    Cond Setup
    resourceType                         CHOICE {
        aperiodic                        SEQUENCE {
            aperiodicSRS-ResourceTrigger     INTEGER (1..maxNrofSRS-
TriggerStates-1),
            csi-RS                           NZP-CSI-RS-ResourceId
OPTIONAL, -- Cond NonCodebook
            slotOffset                       INTEGER (1..32)
```

TABLE 2-continued

```
OPTIONAL, -- Need S
        ...,
        [[
        aperiodicSRS-ResourceTriggerList         SEQUENCE
(SIZE(1..maxNrofSRS-TriggerStates-2))
                                                 OF INTEGER (1..maxNrofSRS-
TriggerStates-1) OPTIONAL -- Need M
        ]]
    },
        semi-persistent                          SEQUENCE {
            associatedCSI-RS                         NZP-CSI-RS-ResourceId
OPTIONAL, -- Cond NonCodebook
        ...
    },
        periodic                                 SEQUENCE {
            associatedCSI-RS                         NZP-CSI-RS-ResourceId
OPTIONAL, -- Cond NonCodebook
        ...
        }
    },
        usage                                    ENUMERATED {beamManagement, codebook,
nonCodebook, antennaSwitching},
        alpha                                    Alpha
OPTIONAL, -- Need S
        p0                                       INTEGER (-202..24)
OPTIONAL, - Cond Setup
        pathlossReferenceRS                      PathlossReferenceRS-Config
OPTIONAL, - Need M
        srs-PowerControlAdjustmentStates         ENUMERATED { sameAsFci2,
separateClosedLoop}                              OPTIONAL, -- Need S
    ,,,,
    [[
        pathlossReferenceRSList-r16              SetupRelease {
PathlossReferenceRSList-r16}                     OPTIONAL -- Need M
    ]]
}
    PathlossReferenceRSList-r16 :: =             SEQUENCE (SIZE
(1..maxNrofSRS-PathlossReferenceRS-r16)) OF PathlossReferenceRS-r16
    PathlossReferenceRS-rl6 ::=                  SEQUENCE {
        srs-PathlossReferenceRS-Id-r16               SRS-PathlossReferenceRS-Id-r16,
        pathlossReferenceRS-r16                      PathlossReferenceRS-Config
}
```

The UE may perform L3 measurement for pathloss reference RS resources, required to be initially measured, which are configured in operation 1o-05 and store and manage the corresponding measurement value. In operation 1o-10, the UE may receive a MAC CE indicating resources required for actual measurement and application of the plurality of pathloss reference RSs configured in the above operation from the BS. The detailed MAC CE structure and operation have been described with reference to FIG. 1N. In operation 1o-15, the UE may measure pathloss reference RS resources indicated through the received MAC CE, calculate the pathloss, and reflect the pathloss to determine power of the SRS transmission signal.

FIG. 1P illustrates a MAC CE structure and a mapping method for dynamically updating pathloss reference signals (pathloss reference RSs) required to be measured according to an embodiment 2 of the disclosure.

Embodiment 2 proposes two structures for the MAC CE structure to be applied to TRP2.

The UE may configure a plurality of pathloss reference RS resources within SRS configuration information (for example, SRS-Config or SRS-ResourceSet configuration) of the RRC message. Further, an indicator for an initial pathloss resource required to be initially measured is needed. For example, an expanded pathloss reference RS configuration using the previously used field as an initial value may be used for dynamic resource update through the MAC CE. The disclosure describes the MAC CE structure considering TRP2. Thereafter, when it is needed to update resources for measuring the pathloss reference RS required for calculating transmission power through the application of SRS transmission, the update may be performed to one of a plurality of pathloss reference RSs through the MAC CE for the corresponding TRP. The following structure is referred to. Hereinafter, the following description is made on the basis of two TRPs (TRP 1 and TRP 2) for convenience of description, but the method proposed in the disclosure may also be similarly applied to a scenario in which two or more TRPs exist.

1. Option 1: the existing MAC CE structure is reused and T bits are introduced to indicate a TRP T field 1p-05: indicates a TRP ID and may be, for example, an indication for TRP1 in settings of 0 and an indication for TRP2 in settings of 1.

Serving cell ID 1p-10 including SRS resource set: 5 bits

BWP ID 1p-15 including SRS resource set ID: 2 bits

Reserved bit 1p-20

SRS Resource Set ID 1p-25: 4 bits

Pathloss RS index 1p-30: 6 bits, pathloss reference RS resource information indicating dynamic changes to the UE 2. Option 2: uses a new MAC CE (a new LCID or an eLCID), in which case the structure of the new MAC CE may be the same as the structure of the existing MAC CE.

Reserved bit 1p-35 and 1p-50

Serving cell ID 1p-40 including SRS resource set: 5 bits

BWP ID 1p-45 including SRS resource set ID: 2 bits

SRS Resource Set ID 1p-55: 4 bits

Pathloss RS index 1p-60: 6 bits, pathloss reference RS resource information indicating dynamic changes to the UE FIG. 1Q is a flowchart illustrating an operation of the UE according to an embodiment 2 of the disclosure.

The RRC-connected UE may receive SRS configuration information in operation 1q-05. The SRS configuration information may include pathloss reference RS configuration information required to determine signal strength and power of SRS transmission for a plurality of TRPs. Pathloss reference RS configuration information applied to one SRS resource set may be provided through SRS-Config of the RRC message, particularly SRS-ResourceSet, and one pathloss reference RS may be conventionally configured through the RRC message but a maximum of 64 resources may be configured. Further, in the above operation, configuration information may be divided and transmitted for each TRP.

The UE may perform L3 measurement for pathloss reference RS resources, required to be initially measured, which are configured in operation 1q-05 and store and manage the corresponding measurement value. In operation 1q-10, the UE may receive a MAC CE indicating resources required for actual measurement and application of the plurality of pathloss reference RSs configured in the above operation from the BS. The detailed MAC CE structure and operation have been described with reference to FIG. 1Q. In operation 1q-15, the UE may measure pathloss reference RS indicated through the received MAC CE, calculate the pathloss, and reflect the pathloss to determine power of the SRS transmission signal.

In operation 1q-15, the UE may analyze the received MAC CE (or identify the LCID) and determine which TRP is for the corresponding MAC CE.

When the received MAC CE is a pathloss reference RS indication MAC CE for TRP1 (or the existing pathloss reference RS update MAC CE when there is no update configuration for each TRP), the UE may determine power of the SRS transmission signal for TRP1 by applying a pathloss value calculated for the corresponding pathloss reference RS resources in operation 1q-20.

When the received MAC CE is a pathloss reference RS indication MAC CE for TRP2, the UE may determine power of the SRS transmission signal for TRP2 by applying a pathloss value calculated for the corresponding pathloss reference RS resources in operation 1q-25.

FIG. 1R is a sequence diagram illustrating operations of the UE and the BS to which embodiment 1 and embodiment 2 of the disclosure can be applied according to an embodiment of the disclosure.

This FIGURE may include measurement and application of pathloss reference RSs for PUSCH and SRS transmission.

A UE 1r-01 may camp on a specific gNB 1r-02 in operation 1r-05 and make a connection configuration with a corresponding service cell in operation 1r-10. The UE may transmit and receive data to and from the corresponding gNB in operation 1r-15, and the BS may provide configuration information for calculating the pathloss that should be considered for uplink transmission by the UE through an RRC configuration in operation 1r-20. In operation 1r-15, the UE may receive at least one of PUSCH configuration information or SRS configuration information, and the PUSCH configuration information may include at least one of a plurality of pathloss reference RS configuration information (a maximum of 64) required for determining the signal strength and power of PUSCH transmission and configuration information for the correlation between SRIs and pathloss reference RSs, wherein a plurality of pieces of (a maximum of 64) pathloss reference RS configuration information for SRS transmission may be configured for each SRS-ResourceSet. The UE may perform L3 measurement for a maximum of 4 pathloss reference RS resources, required to be initially measured, which are configured for the PUSCH and initial pathloss resources configured for the SRS and store and manage the corresponding measurement value. Further, in all the above operations, pathloss reference RS configuration information for TRP2 may be included in the PUSCH and SRS configuration.

In operation 1r-25, the UE may receive a pathloss reference RS update MAC CE for updating mapping between pathloss reference RSs and SRI indicators from the gNB, and update and manage mapping between the pathloss reference RSs and the SRI indicators as information indicated by the corresponding MAC CE. In operation 1r-30, the UE may receive scheduling for uplink transmission (PUSCH) from the BS through DCI, and corresponding control information may not only include scheduling resource information but also indicate a specific pathloss reference RS applied to calculation of the signal strength and power for the corresponding transmission. That is, the pathloss reference RS mapped to the SRI indicator of DCI may be indicated, and the UE may measure corresponding pathloss reference RS resources, calculate the pathloss, reflect the pathloss to determine power of the PUSCH transmission signal, and perform transmission in operation 1r-35. The MAC CE in the above operation may be for TRP1 or TRP2.

The UE may perform SRS transmission according to SRS transmission configuration information received through the RRC message while performing the operation in which case transmission power may be determined on the basis of the pathloss reference RS indicated through the initial RRC configuration. In operation 1r-40, the UE may receive a MAC CE indicating pathloss resources required to be measured and applied for actual SRS transmission from the gNB. In operation 1r-45, the UE may measure pathloss reference RS resources indicated through the received MAC CE, calculate the pathloss, and reflect the pathloss to determine power of the SRS transmission signal. The MAC CE in the above operation may be for TRP1 or TRP2.

FIG. 1S is a flowchart illustrating an operation of the gNB according to an embodiment of the disclosure.

The gNB may establish an RRC connection with the UE in operation 1s-05 and make a request for and receive a UE capability in operation 1s-10. The gNB may determine whether there is a dynamic pathloss reference RS update capability for a plurality of TRPs according to the UE capability in operation 1s-10, and thereafter provide RRC configuration information considering the UE capability in operation 1s-15. In operation 1s-15, the gNB may provide pathloss reference RS configurations for a plurality of TRPs to the UE through at least one of PUSCH configuration or SRS configuration information. For the UE having the dynamic pathloss reference RS update capability for the plurality of TRPs, the gNB may update mapping information between the pathloss reference RS which can be applied to PUSCH transmission for the plurality of TRPs and the SRI indicator through a MAC CE in operation 1s-20. In operation 1s-25, the gNB may indicate a pathloss reference RS which should be applied to actual PUSCH and SRS transmission for a plurality of TRPs to be associated with an SRI index of DCI or indicate a specific pathloss reference RS index to perform transmission through the MAC CE. In operation 1s-30, the gNB may receive an uplink signal (PUSCH or SRS) transmitted by the UE.

Figure 1T:
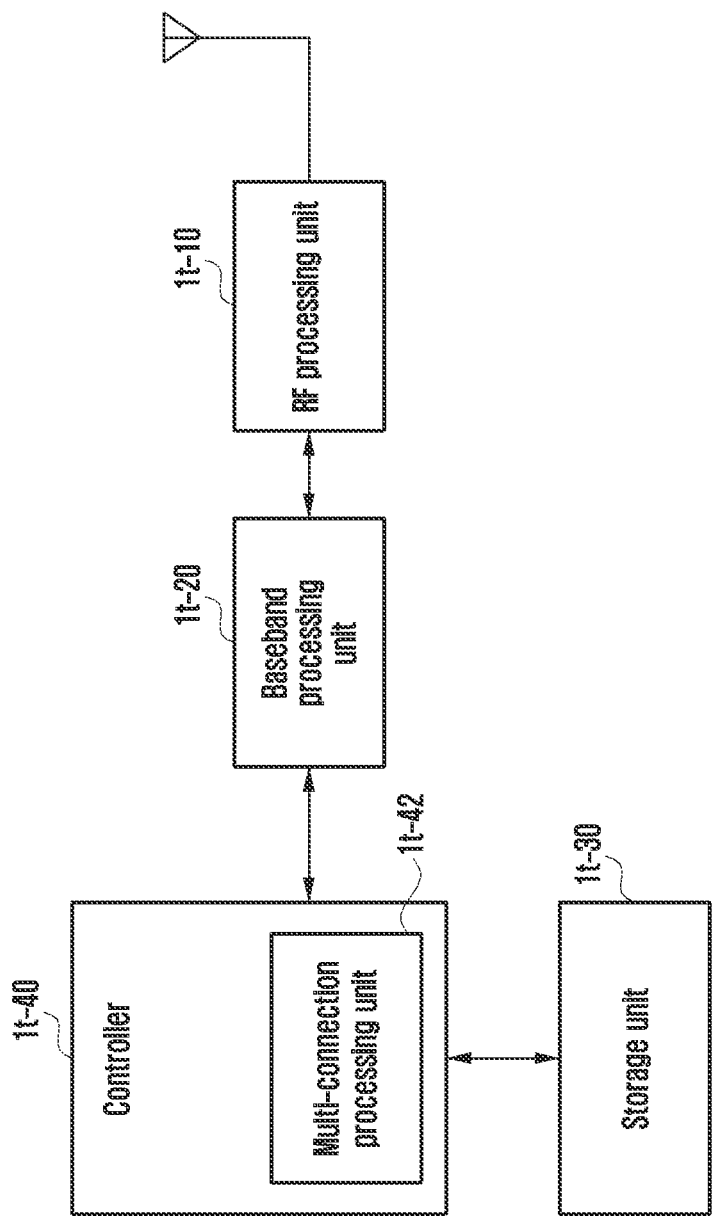
FIG. 1T is a block diagram illustrating a structure of the UE according to an embodiment of the disclosure.

FIG. 1T is a block diagram illustrating a structure of the UE according to an embodiment of the disclosure.

Referring to FIG. 1T, the UE includes a radio-frequency (RF) processing unit 1t-10, a baseband processing unit 1t-20, a storage unit 1t-30, and a controller 1t-40.

The RF processing unit 1t-10 performs a function for transmitting and receiving a signal through a radio channel, such as band conversion and amplification of a signal. That is, the RF processing unit 1t-10 up-converts a baseband signal provided from the baseband processing unit 1t-20 into an RF band signal, transmits the RF band signal through an antenna, and then down-converts the RF band signal received through the antenna into a baseband signal. For example, the RF processing unit 1t-10 may include a transmission filter, a reception filter, an amplifier, a mixer, an oscillator, a digital-to-analog converter (DAC), an analog-to-digital converter (ADC), and the like. Although FIG. 1T illustrates only one antenna, the UE may include a plurality of antennas. In addition, the RF processing unit 1t-10 may include a plurality of RF chains. Moreover, the RF processing unit 1t-10 may perform beamforming. For the beamforming, the RF processing unit 1t-10 may control a phase and a size of each signal transmitted/received through a plurality of antennas or antenna elements. The RF processing unit may perform MIMO and receive a plurality of layers when performing the MIMO operation.

The baseband processing unit 1t-20 performs a function for a conversion between a baseband signal and a bitstream according to a physical layer standard of the system. For example, in data transmission, the baseband processing unit 1t-20 generates complex symbols by encoding and modulating a transmission bitstream. Further, in data reception, the baseband processing unit 1t-20 reconstructs a reception bitstream by demodulating and decoding a baseband signal provided from the RF processing unit 1t-10. For example, in an orthogonal frequency-division multiplexing (OFDM) scheme, when data is transmitted, the baseband processing unit 1t-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, in data reception, the baseband processing unit 1t-20 divides the baseband signal provided from the RF processing unit 1t-10 in the unit of OFDM symbols, reconstructs the signals mapped to the subcarriers through a fast Fourier transform (FFT) operation, and then reconstructs a reception bitstream through demodulation and decoding.

The baseband processing unit 1t-20 and the RF processing unit 1t-10 transmit and receive a signal as described above. Accordingly, the baseband processing unit 1t-20 and the RF processing unit 1t-10 may be referred to as a transmitter, a receiver, a transceiver, or a communication unit. At least one of the baseband processing unit 1t-20 and the RF processing unit 1t-10 may include a plurality of communication modules for supporting a plurality of different radio access technologies. In addition, at least one of the baseband processing unit 1t-20 and the RF processing unit 1t-10 may include different communication modules to process signals of different frequency bands. For example, the different radio access technologies may include a wireless LAN (for example, IEEE 802.11) and a cellular network (for example, LTE). Further, the different frequency bands may include a super high frequency (SHF) (for example, 2.NRHz, NRhz) band and a millimeter (mm) wave (for example, 60 GHz) band.

The storage unit 1t-30 stores data such as a basic program, an application, and setting information for the operation of the UE. Particularly, the storage unit 1t-30 may store information related to a second access node for performing wireless communication through a second radio access technology. The storage unit 1t-30 provides stored data according to a request from the controller 1t-40.

The controller 1t-40 controls overall operations of the UE. For example, the controller 1t-40 transmits and receives a signal through the baseband processing unit 1t-20 and the RF processing unit 1t-10. Further, the controller 1t-40 records data in the storage unit 1t-30 and reads the data. To this end, the controller 1t-40 may include at least one processor. For example, the controller 1t-40 may include a communication processor (CP) that performs a control for communication, and an application processor (AP) that controls a higher layer such as an application program. Further, the controller 1t-40 may include a multi-connection processing unit 1t-42.

Figure 1U:
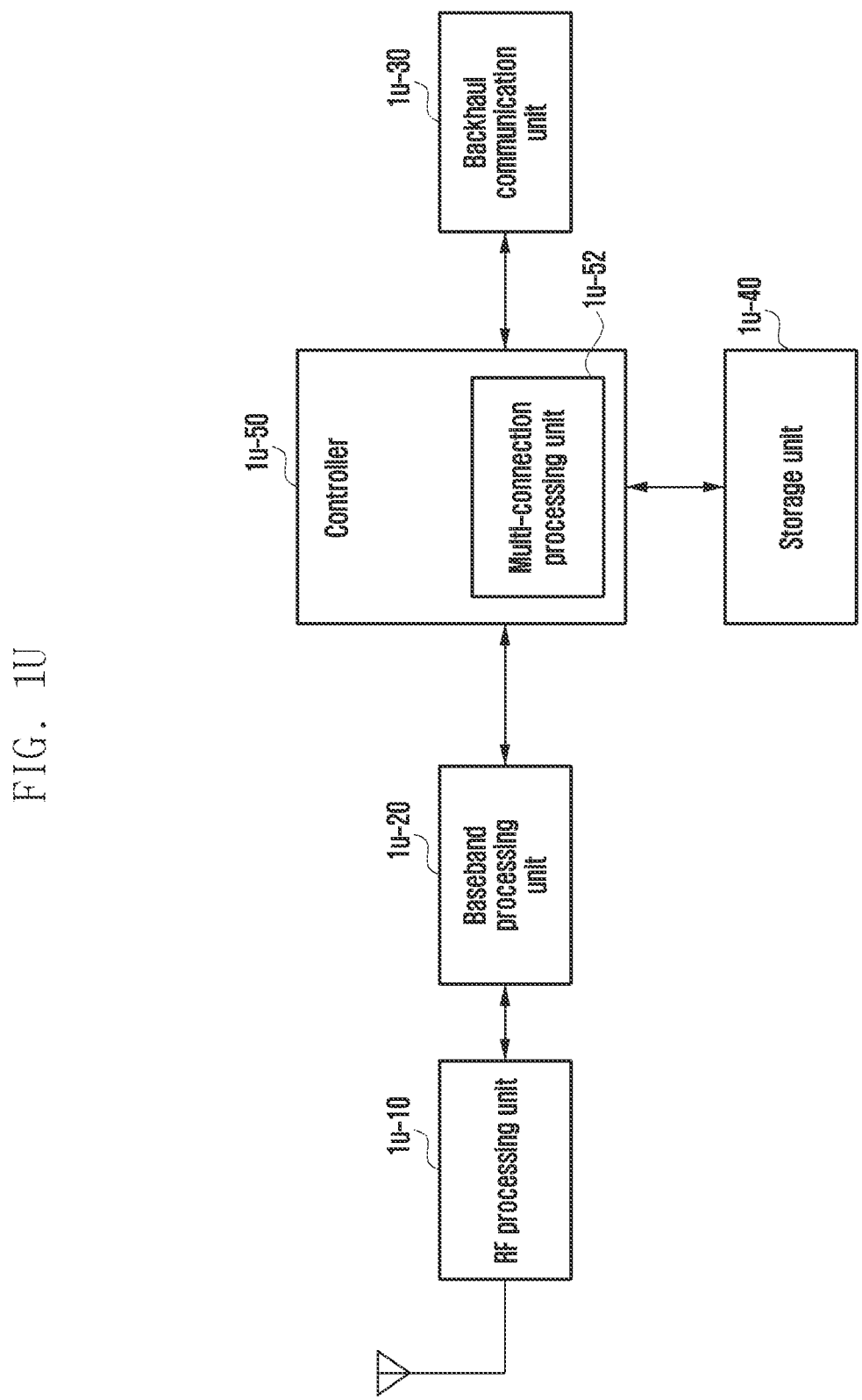
FIG. 1U is a block diagram illustrating a structure of the gNB according to an embodiment of the disclosure.

FIG. 1U is a block diagram illustrating a structure of the gNB according to an embodiment of the disclosure.

Referring to FIG. 1U, the gNB includes an RF processing unit 1u-10, a baseband processing unit 1u-20, a backhaul communication unit 1u-30, a storage unit 1u-40, and a controller 1u-50.

The RF processing unit 1u-10 performs a function for transmitting and receiving a signal through a wireless channel, such as band conversion and amplification of a signal. That is, the RF processing unit 1u-10 up-converts a baseband signal provided from the baseband processing unit 1u-20 into an RF band signal, transmits the RF band signal through an antenna, and then down-converts the RF band signal received through the antenna into a baseband signal. For example, the RF processing unit 1u-10 may include a transmission filter, a reception filter, an amplifier, a mixer, an oscillator, a DAC, and an ADC. Although FIG. 1U illustrates only one antenna, the first access node may include a plurality of antennas. The RF processing unit 1u-10 may include a plurality of RF chains. Further, the RF processing unit 1u-10 may perform beamforming. For the beamforming, the RF processing unit 1u-10 may control the phase and the size of each of the signals transmitted and received through a plurality of antennas or antenna elements. The RF processing unit may perform a downlink MIMO operation by transmitting one or more layers.

The baseband processing unit 1u-20 performs a function of performing conversion between a baseband signal and a bitstream according to a physical-layer standard of the first radio-access technology. For example, in data transmission, the baseband processing unit 1u-20 generates complex symbols by encoding and modulating a transmission bitstream. Further, in data reception, the baseband processing unit 1u-20 reconstructs a reception bitstream by demodulating and decoding a baseband signal provided from the RF processing unit 1u-10. For example, in an OFDM scheme, when transmitting data, the baseband processing unit 1u-20 may generate complex symbols by encoding and modulating the transmission bitstream, map the complex symbols to subcarriers, and then configure OFDM symbols through an IFFT operation and CP insertion. In addition, when data is received, the baseband processing unit 1u-20 divides a baseband signal provided from the RF processing unit 1u-10 in units of OFDM symbols, recovers signals mapped with subcarriers through an FFT operation, and then recovers a reception bitstream through demodulation and decoding. The baseband processing unit 1u-20 and the RF processing unit 1u-10 may transmit and receive signals as described above. Accordingly, the baseband processing unit 1u-20 and the RF processing unit 1u-10 may be referred to as a transmitter, a receiver, a transceiver, a communication unit, or a wireless communication unit.

The backhaul communication unit 1u-30 provides an interface for communicating other nodes within the network. That is, the backhaul communication unit 1u-30 converts a bitstream transmitted to another node, for example, the SeNB or a core network from the MeNB, into a physical signal and converts a physical signal received from the other node into the bitstream.

The storage unit 1u-40 stores data such as a basic program, an application, and setting information for the operation of the MeNB. Particularly, the storage unit 1u-40 may store information on bearers allocated to the accessed UE, a measurement result reported by the accessed UE, and the like. Further, the storage unit 1u-40 may store information that is a reference for determining whether to provide multiple connections to the UE or stop the connections. In addition, the storage unit 1u-40 provides the stored data according to a request from the controller 1u-50.

The controller 1u-50 controls the overall operation of the MeNB. For example, the controller 1u-50 transmits and receives signals through the baseband processing unit 1u-20 and the RF processing unit 1u-10 or through the backhaul communication unit 1u-30. Further, the controller 1u-50 records data in the storage unit 1u-40 and read the data. To this end, the controller 1u-50 may include at least one processor. Further, the controller 1u-50 may include a multi-connection processing unit 1u-52.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message including PathlossReferenceRS information, a first sri-PUSCH-MappingToAddModList and a second sri-PUSCH-MappingToAddModList, wherein the first sri-PUSCH-MappingToAddModList and the second sri-PUSCH-MappingToAddModList respectively include mapping information between a sounding reference signal (SRS) resource indicator (SRI) indicator and a PathlossReferenceRS identity (ID), and wherein the PathlossReferenceRS information includes the PathlossReferenceRS ID and a reference signal (RS) index;
   receiving, from the base station, a medium access control (MAC) control element (CE) for physical uplink shared channel (PUSCH) pathloss RS update, the MAC CE including the PathlossReferenceRS ID, an SRI ID, and one-bit field, wherein the SRI ID indicates the SRI indicator, and wherein the one-bit field indicates whether the SRI ID is associated with the first sri-PUSCH-MappingToAddModList or the second sri-PUSCH-MappingToAddModList; and
   receiving, from the base station, downlink control information (DCI) including SRI information associated with the PathlossReferenceRS ID.

2. The method of claim 1, further comprising:
   updating the first sri-PUSCH-MappingToAddModList or the second sri-PUSCH-MappingToAddModList based on the MAC CE.

3. The method of claim 1,
   wherein in case that the one-bit field is set to 0, the SRI ID to be updated is associated with the first-SRS resource set sri-PUSCH-MappingToAddModList, and
   wherein in case that the one-bit field is set to 1, the SRI ID to be updated is associated with the second sri-PUSCH-MappingToAddModList.

4. The method of claim 1,
   wherein a first SRS resource set is configured for a first transmission reception point (TRP) and a second SRS resource set is a configured for the second TRP, and
   wherein the first sri-PUSCH-MappingToAddModList is associated with the first TRP and the second sri-PUSCH-MappingToAddModList is associated with the second TRP.

5. The method of claim 1, further comprising:
   estimating a downlink pathloss using a PathlossReferenceRS corresponding to the PathlossReferenceRS ID based on the SRI information; and
   transmitting, to the base station, a PUSCH with a transmission power based on the estimated downlink pathloss.

6. A method performed by a base station in a wireless communication system, the method comprising:
   transmitting, to a terminal, a radio resource control (RRC) message including PathlossReferenceRS information a first sri-PUSCH-MappingToAddModList and a second sri-PUSCH-MappingToAddModList, wherein the first sri-PUSCH-MappingToAddModList and the second sri-PUSCH-MappingToAddModList respectively include mapping information between a sounding reference signal (SRS) resource indicator (SRI) indicator and a PathlossReferenceRS identity (ID), and wherein the PathlossReferenceRS information includes the PathlossReferenceRS ID and a reference signal (RS) index;
   transmitting, to the terminal, a medium access control (MAC) control element (CE) for physical uplink shared channel (PUSCH) pathloss RS update, the MAC CE including the PathlossReferenceRS ID, an SRI ID, and one-bit field, wherein the SRI ID indicates the SRI indicator, and wherein the one-bit field indicates whether the SRI ID is associated with the first sri-PUSCH-MappingToAddModList or the second sri-PUSCH-MappingToAddModList; and
   transmitting, to the terminal, downlink control information (DCI) including SRI information associated with the PathlossReferenceRS ID.

7. The method of claim 6,
   wherein the first sri-PUSCH-MappingToAddModList or the second sri-PUSCH-MappingToAddModList is updated based on the MAC CE.

8. The method of claim 6,
   wherein in case that the one-bit field is set to 0, the SRI ID to be updated is associated with the first-SRS resource set sri-PUSCH-MappingToAddModList, and
   wherein in case that the one-bit field is set to 1, the SRI ID to be updated is associated with the second sri-PUSCH-MappingToAddModList.

9. The method of claim 6,
   wherein a first SRS resource set is configured for a first transmission reception point (TRP) and a second SRS resource set is configured for the second TRP, and
   wherein the first sri-PUSCH-MappingToAddModList is associated with the first TRP and the second sri-PUSCH-MappingToAddModList is associated with the second TRP.

10. A terminal in a wireless communication system, the terminal comprising:
a transceiver; and
a controller configured to:
receive, from a base station via the transceiver, a radio resource control (RRC) message including PathlossReferenceRS information, a first sri-PUSCH-MappingToAddModList and a second sri-PUSCH-MappingToAddModList, wherein the first sri-PUSCH-MappingToAddModList and the second sri-PUSCH-MappingToAddModList respectively include mapping information between a sounding reference signal (SRS) resource indicator (SRI) indicator and a PathlossReferenceRS identity (ID), and wherein the PathlossReferenceRS information includes the PathlossReferenceRS ID and a reference signal (RS) index,
receive, from the base station via the transceiver, a medium access control (MAC) control element (CE) for physical uplink shared channel (PUSCH) pathloss RS update, the MAC CE including the PathlossReferenceRS ID, an SRI ID, and one-bit field, wherein the SRI ID indicates the SRI indicator, and wherein the one-bit field indicates whether the SRI ID is associated with the first sri-PUSCH-MappingToAddModList or the second sri-PUSCH-MappingToAddModList, and
receive, from the base station via the transceiver, downlink control information (DCI) including SRI information associated with the PathlossReferenceRS ID.

11. The terminal of claim 10, wherein the controller is further configured to:
update the first sri-PUSCH-MappingToAddModList or the second sri-PUSCH-MappingToAddModList based on the MAC CE.

12. The terminal of claim 10,
wherein in case that the one-bit field is set to 0, the SRI ID to be updated is associated with the first sri-PUSCH-MappingToAddModList, and
wherein in case that the one-bit field is set to 1, the SRI ID to be updated is associated with the second sri-PUSCH-MappingToAddModList.

13. The terminal of claim 10,
wherein a first SRS resource set is configured for a first transmission reception point (TRP) and a second SRS resource set is a configured for the second TRP, and
wherein the first sri-PUSCH-MappingToAddModList is associated with the first TRP and the second sri-PUSCH-MappingToAddModList is associated with the second TRP.

14. The terminal of claim 10, wherein the controller is further configured to:
estimate a downlink pathloss using a PathlossReferenceRS corresponding to the PathlossReferenceRS ID based on the SRI information; and
transmit, to the base station via the transceiver, a PUSCH with a transmission power based on the estimated downlink pathloss.

15. A base station in a wireless communication system, the base station comprising:
a transceiver; and
a controller configured to:
transmit, to a terminal via the transceiver, a radio resource control (RRC) message including PathlossReferenceRS information, a first sri-PUSCH-MappingToAddModList and a second sri-PUSCH-MappingToAddModList, wherein the first sri-PUSCH-MappingToAddModList and the second sri-PUSCH-MappingToAddModList respectively include mapping information between a sounding reference signal (SRS) resource indicator (SRI) indicator and a PathlossReferenceRS identity (ID), and wherein the PathlossReferenceRS information includes the PathlossReferenceRS ID and a reference signal (RS) index,
transmit, to the terminal via the transceiver, a medium access control (MAC) control element (CE) for physical uplink shared channel (PUSCH) pathloss RS update, the MAC CE including the PathlossReferenceRS ID, an SRI ID, and one-bit field, wherein the SRI ID indicates the SRI indicator, and wherein the one-bit field indicates whether the SRI ID is associated with the first sri-PUSCH-MappingToAddModList or the second sri-PUSCH-MappingToAddModList, and
transmit, to the terminal via the transceiver, downlink control information (DCI) including SRI information associated with the PathlossReferenceRS ID.

16. The base station of claim 15,
wherein the first sri-PUSCH-MappingToAddModList or the second sri-PUSCH-MappingToAddModList is updated based on the MAC CE.

17. The base station of claim 15,
wherein in case that the one-bit field is set to 0, the SRI ID to be updated is associated with the first sri-PUSCH-MappingToAddModList, and
wherein in case that the one-bit field is set to 1, the SRI ID to be updated is associated with the second sri-PUSCH-MappingToAddModList.

18. The base station of claim 15,
wherein a first SRS resource set is configured for a first transmission reception point (TRP) and a second SRS resource set is a configured for the second TRP, and
wherein the first sri-PUSCH-MappingToAddModList is associated with the first TRP and the second sri-PUSCH-MappingToAddModList is associated with the second TRP.

* * * * *